(12) United States Patent
Xie

(10) Patent No.: US 10,399,257 B1
(45) Date of Patent: Sep. 3, 2019

(54) CONTROLLED VERTICAL MATERIAL DISTRIBUTION

(71) Applicant: Alex Xie, West Windsor, NJ (US)

(72) Inventor: Alex Xie, West Windsor, NJ (US)

( * ) Notice: Subject to any disclaimer, the term of this patent is extended or adjusted under 35 U.S.C. 154(b) by 0 days.

(21) Appl. No.: 16/233,691

(22) Filed: Dec. 27, 2018

Related U.S. Application Data

(63) Continuation-in-part of application No. 16/038,238, filed on Jul. 18, 2018, now Pat. No. 10,233,032.

(51) Int. Cl.
*B29C 39/44* (2006.01)
*B29C 39/24* (2006.01)
*B65G 17/34* (2006.01)

(52) U.S. Cl.
CPC .............. *B29C 39/44* (2013.01); *B29C 39/24* (2013.01); *B65G 17/345* (2013.01)

(58) Field of Classification Search
CPC ............... B65G 17/32; B65G 17/34; B65G 2203/0241; B65G 2203/0258; B65G 2203/04; B65G 2203/042; B65G 2203/044; B65G 2203/047; B65G 65/28; B65G 65/32; B29C 39/003; B29C 39/04; B29C 39/24; B29C 39/44; B29C 67/243; B29C 67/44; B29C 31/04; B28B 13/02; B28B 13/026; B01F 15/0201; B01F 15/0202; G05D 9/00; G01F 1/52
See application file for complete search history.

(56) References Cited

U.S. PATENT DOCUMENTS

| 1,597,103 | A |   | 8/1926  | Oberherr |             |
|-----------|---|---|---------|----------|-------------|
| 1,735,674 | A |   | 11/1929 | Copeland |             |
| 1,884,111 | A | * | 10/1932 | Morgan   | B65G 47/62  |
|           |   |   |         |          | 105/242     |
| 1,935,985 | A |   | 11/1933 | Oberherr |             |
| 1,949,517 | A |   | 3/1934  | Van Der Pyl |          |
| 2,044,585 | A |   | 6/1936  | Macht    |             |
| 2,140,197 | A |   | 12/1938 | Batcheller |           |
| 3,088,713 | A |   | 5/1963  | Gard     |             |
| 3,137,398 | A | * | 6/1964  | Steffensen | C21B 7/18 |
|           |   |   |         |          | 198/578     |
| 3,216,464 | A |   | 11/1965 | Horst    |             |
| 3,318,984 | A |   | 5/1967  | Dussel   |             |
| 3,435,967 | A | * | 4/1969  | Sackett, Sr. | B65G 69/00 |
|           |   |   |         |          | 198/571     |

(Continued)

FOREIGN PATENT DOCUMENTS

FR 002627424 A1 8/1989

*Primary Examiner* — Glenn F Myers
(74) *Attorney, Agent, or Firm* — Walter J. Tencza, Jr.

(57) ABSTRACT

An apparatus including a delivery device including a tray, and a device for changing the tray from a receiving state to a dumping state; a device for supplying one or more materials to the delivery device, while the tray of the delivery device is in a receiving state; a track device including a track and a motor; and a mold having an elongated opening, wherein the delivery device is configured to move back and forth on the track of the track device in response to the motor of the track device; wherein the track of the track device is substantially parallel to the elongated opening of the mold; and wherein the device for changing the tray from the receiving state to the dumping state causes one or more materials to fall from the tray through the elongated opening of the mold into an inner chamber of the mold.

14 Claims, 18 Drawing Sheets

(56) References Cited

U.S. PATENT DOCUMENTS

| | | | |
|---|---|---|---|
| 3,601,161 A | 8/1971 | Buhrer | |
| 3,822,794 A * | 7/1974 | Fougea | B28B 13/02 |
| | | | 249/129 |
| 4,013,616 A | 3/1977 | Wallace | |
| 4,209,486 A | 6/1980 | Ross | |
| 4,325,684 A * | 4/1982 | Blackwood | B28B 1/14 |
| | | | 425/125 |
| 4,343,752 A | 8/1982 | Cann | |
| 4,399,904 A | 8/1983 | Canziani | |
| 4,680,155 A * | 7/1987 | Rochefort | B29C 39/12 |
| | | | 264/108 |
| 4,846,335 A | 7/1989 | Hartlepp | |
| 5,266,253 A | 11/1993 | Dijkhuizen | |
| 5,795,513 A | 8/1998 | Austin | |
| 5,885,503 A | 3/1999 | Bordener | |
| 6,082,827 A | 7/2000 | McFall | |
| 6,517,915 B1 | 2/2003 | Banus | |
| 6,616,874 B1 | 9/2003 | Lazar | |
| 6,702,967 B2 | 3/2004 | Overholt et al. | |
| 6,762,382 B1 * | 7/2004 | Danelski | B07C 5/36 |
| | | | 198/370.04 |
| 8,353,146 B1 | 1/2013 | Bareford | |
| 8,436,075 B2 | 5/2013 | Buskila et al. | |
| 8,702,886 B2 | 4/2014 | Yaniv et al. | |
| 9,186,819 B1 | 11/2015 | Grzeskowiak, II | |
| 9,409,726 B2 | 8/2016 | Pape | |
| 9,511,516 B2 | 12/2016 | Xie | |
| 9,707,698 B1 | 7/2017 | Xie | |
| 9,718,303 B2 | 8/2017 | Greskowiak, II et al. | |
| 2002/0056607 A1 | 5/2002 | Bonnet | |
| 2004/0175514 A1 | 9/2004 | Stiattesi | |
| 2006/0101752 A1 | 5/2006 | Sakai | |
| 2012/0283384 A1 | 11/2012 | Cox | |
| 2014/0127450 A1 | 5/2014 | Riman | |
| 2016/0089818 A1 | 3/2016 | Xie | |
| 2016/0236984 A1 | 8/2016 | Riman | |

* cited by examiner

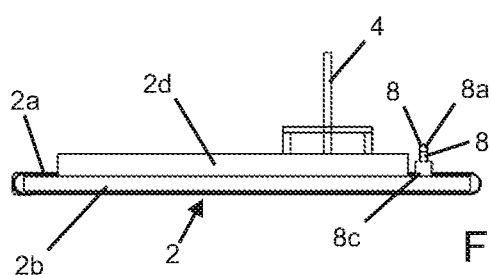
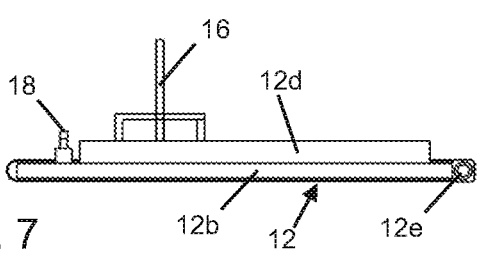
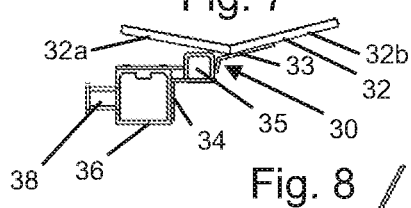
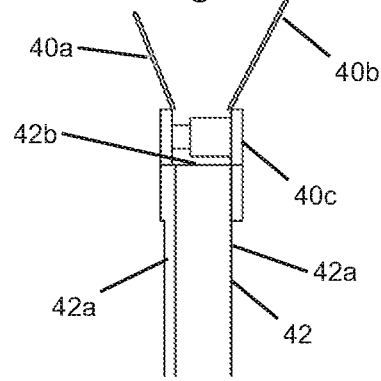

CONTROLLED VERTICAL MATERIAL DISTRIBUTION

CROSS REFERENCE TO RELATED APPLICATION(S)

The present application is a continuation in part of and claims the priority of U.S. patent application Ser. No. 16/038,238, titled "MATERIAL DELIVERY METHOD AND APPARATUS FOR VERTICAL DISTRIBUTION", filed on Jul. 18, 2018.

FIELD OF THE INVENTION

This invention relates to improved methods and apparatus concerning quartz slabs.

BACKGROUND OF THE INVENTION

Quartz is the second most abundant mineral in the Earth's crust and one of the hardest naturally occurring materials. One of its many uses is in "engineered stone". Engineered stone, including quartz, has become a common surfacing and countertop choice in many countries throughout the world. Its applications include kitchen and bathroom countertops, tables and desktops, floor tile, food service areas, wall cladding, and various other horizontal and vertical applications.

The production of engineered stone generally involves particulate materials such as ground quartz rock, crushed glass, rocks, pebbles, sand, shells, silicon, and other inorganic materials combined with polymers, binders, resins, colorants, dyes, etc. The particulate material(s) may be varying sizes ranging from four hundred mesh particle size to four mesh particle size with multiple materials of different sizes used simultaneously. The polymer may include agents to such as a binder, hardener, initiator, or combination of such. The particulate material(s) and polymers, binders, resins, colorants, dyes, etc. are then mixed resulting in a slightly damp mixture. This initial mixture may be processed through a crushing machine to reduce the size of the combined particles. The resultant, finer mixture may be poured into a supporting mold, tray, or other supporting structure, after that, the slab is moved into a vacuumed press machine to be pressed, and then, moved into a curing machine to be cured into a hardened quartz slab. After curing, the slab is generally moved in a grinder to be grinded to a desired thickness, followed by a polisher to finish the product.

Quartz based stone has many advantages over natural stone such as marble and granite. Compared to these natural stones quartz is harder, stronger, less water absorbent, and more resistant to staining, scratching, breakage, chemicals, and heat. One of the drawbacks of quartz is its perceived lack of natural, random looking veins and color patterns compared with natural stones. This invention addresses a method of producing a quartz based slab with single color patterns or multiple color patterns and/or veins.

U.S. Pat. No. 9,511,516 and U.S. patent application Ser. No. 15/854,519 provides a vertical distribution method and apparatus and is incorporated by reference herein.

SUMMARY OF THE INVENTION

One or more embodiments of the present invention provide an apparatus comprising a delivery device including a tray, and a device for changing the tray from a receiving state to a dumping state; a device for supplying one or more materials to the delivery device, while the tray of the delivery device is in a receiving state; a track device including a track and a motor; and a mold having an elongated opening, wherein the delivery device is configured to move back and forth on the track of the track device in response to the motor of the track device; wherein the track of the track device is substantially parallel to the elongated opening of the mold; and wherein the device for changing the tray from the receiving state to the dumping state causes one or more materials to fall from the tray through the elongated opening of the mold into an inner chamber of the mold, when the tray is changed from the receiving state to the dumping state.

The device for changing the tray from the receiving state to the dumping state may cause the tray to rotate.

The tray may include a conveyor belt; and the device for changing the tray from the receiving state to the dumping state may cause the conveyor belt to move.

In at least one embodiment, the tray may include first and second walls; and the device for changing the tray from the receiving state to the dumping state may cause the first and second walls to separate from each other.

The device for supplying one or more materials to the delivery device may include: a first conveyor device having a first conveyor belt; and a second conveyor device having a second conveyor belt.

The device for supplying one or more materials to the delivery device may include: a first mixing device configured to mix a first material located on the first conveyor belt; and a second mixing device configured to mix a second material, different from the first material, and located on the second conveyor belt.

The device for supplying one or more materials to the delivery device may include a first gate device configured to limit the height of a first material located on the first conveyor belt; and a second gate device configured to limit the height of a second material, different from the first material, and located on the second conveyor belt.

The tray may include a first section and a second section; wherein the first section is at an angle of greater than one hundred and thirty-five degrees, and less than one hundred and eighty degrees with respect to the second section.

In at least one embodiment of the present invention a method is provided comprised of receiving one or more materials on a tray of a delivery device during a receiving state, while the delivery device is at a first location with respect to a mold; moving the delivery device along a track to a second location with respect to the mold, which is different from the first location; and dumping the one or more materials from the tray of the delivery device into the mold during a dumping state. The tray may be comprised of various components described above and as follows and may be changed from the receiving state to the dumping state as described above and as follows in the present application.

In at least one embodiment, an apparatus is provided comprising a delivery device including a tray; one or more material supplying devices for supplying one or more materials to the tray of the delivery device; a track device including a track and a motor; a computer processor; and a computer memory. The computer processor may be configured to implement computer programming in the computer memory to control the one or more material supplying devices to supply a predetermined amount of the one or more materials to the tray of the delivery device, and to control movement of the delivery device along the track of the track device to thereby cause a combination of the one or more materials to fall off of the tray and into a mold through an opening of the mold.

In at least one embodiment, the delivery device includes a first sensor; wherein the first sensor is configured to sense a height of material residing in the mold at a particular location; and wherein the computer processor is programmed by computer software stored in computer memory to control the movement of the tray to thereby control the amount of material dropped into the mold based on the height sensed by the first sensor.

In at least one embodiment, the tray has a bottom having a periphery; wherein the tray has at least three side walls, which partially enclose the periphery of the bottom of the tray, and which are at an angle with respect to the bottom; and wherein part of the periphery of the bottom of the tray does not have a corresponding side wall, such that a material dropped on the bottom of the tray, can fall off of the tray by moving over the part of the periphery of the bottom of the tray. The computer processor may be programmed by computer software stored in the computer memory to cause the movement of the tray to thereby cause the material to move over the part of the periphery of the bottom of the tray, and to fall off of the tray, into a mold through an opening of the mold.

The movement of the tray, which is caused by the computer processor, may be a stop and go motion of the delivery device or a stop, go back, and go motion of the delivery device, with respect to the mold.

In at least one embodiment a method is provided including the steps of supplying a predetermined amount of one or more materials to a tray attached to a delivery device in response to control of a computer processor programmed by computer software in computer memory; and moving the delivery device and the tray along a track of a track device to thereby cause a combination of the one or more materials to fall off of the tray and into a mold through an opening of the mold, in response to control of the computer processor programmed by computer software in the computer memory.

The method may further include using a first sensor attached to the delivery device to sense a height of material residing in the mold at a particular location; and controlling the step of moving the delivery device and the tray to thereby control the amount of material dropped into the mold based on the height sensed by the first sensor, in response to control of the computer processor programmed by computer software in the computer memory.

The tray may be configured as previously discussed. The step of moving the delivery device and the tray may be, for example, a stop and go motion of the delivery device and the tray with respect to the mold or a stop, go back, and go motion of the delivery device and the tray with respect to the mold.

BRIEF DESCRIPTION OF THE DRAWINGS

FIG. 5 shows a front view of some of the components of the apparatus of FIG. 1, including a first conveyor device, a first mixing device, and a first gate device;

FIG. 6 shows a front view of some of the components of the apparatus of FIG. 1, including a second conveyor device, a second mixing device, and a second gate device;

FIG. 7 shows a front view of some of the components of the apparatus of FIG. 1, including the delivery device and the track device;

FIG. 8 shows a front view of some of the components of the apparatus of FIG. 1, including a funnel device and a mold device;

DETAILED DESCRIPTION OF THE DRAWINGS

Figure 1:
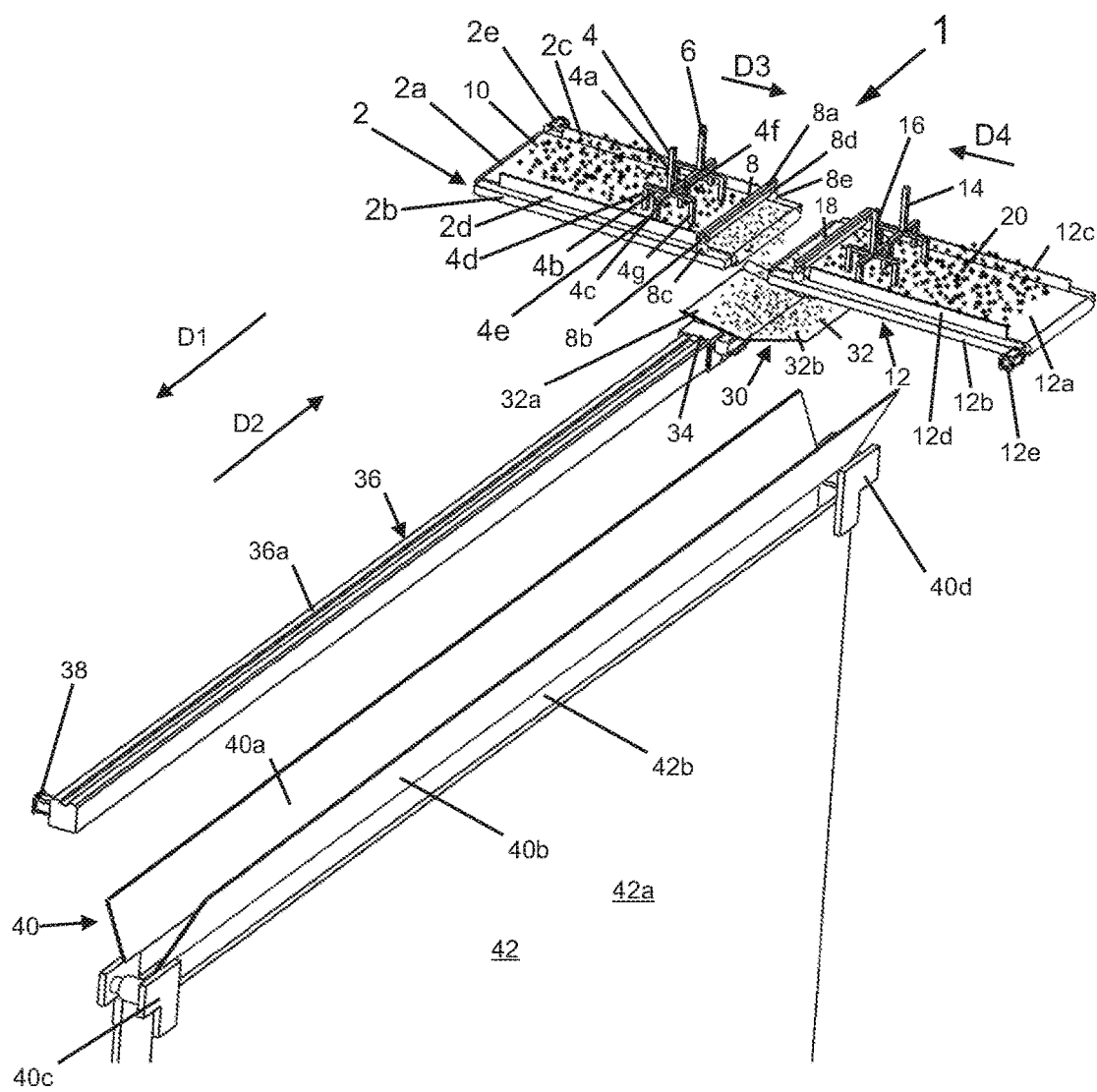
FIG. 1 shows a simplified front, top, and right side perspective view of an apparatus in accordance with an embodiment of the present invention with the apparatus of FIG. 1 shown in a first state.

FIG. 1 shows a simplified front, top, and right side perspective view of an apparatus 1 in accordance with an embodiment of the present invention with the apparatus 1 of FIG. 1 shown in a first state or a receiving state.

The apparatus 1 includes a conveyor device 2, a mixing or stirring device 4, a mixing or stirring device 6, a gate device 8, a conveyor device 12, a mixing or stirring device 14, a mixing or stirring device 16, and a gate device 18. The apparatus 1 also includes a delivery device 30, a track device 36, a funnel device 40, and a mold 42.

The conveyor device 2 includes a conveyor belt 2a, a platform, base, or plate 2b, walls 2c and 2d, and conveyor device motor 2e. Similarly or identically, the conveyor device 12 includes a conveyor belt 12a, a platform, base, or plate 12b, walls 12c and 12d, and conveyor device motor 12e.

The mixing or stirring device 4 includes central shaft 4a, horizontal members 4b and 4c, which are perpendicular to the central shaft 4a, and vertical members 4d, 4e, 4f, and 4f, which are fixed to the horizontal members 4b and 4c, and which are perpendicular to the horizontal members 4b and 4c, and parallel to the central shaft 4a. The mixing or stirring device 4 may include a motor for causing the mixing or stirring device 4 to rotate about the central shaft 4a for mixing material 10 on the belt 2a. The mixing or stirring device 4 may be controlled by a computer processor 202 shown in FIG. 11. The computer processor 202 may control the speed at which the central shaft 4a rotates. The computer processor 202 may also control the height of the stirring device 4 in order to level the pile of the material 10 moving toward to the member 8a of the gate device 8.

The mixing or stirring devices 6, 14, and 16 may be identical to the mixing device 4 and may be controlled by the computer processor 202, independently from each other, but in a similar or identical manner.

The track device 36 may include a track device servo motor 38 which causes the delivery device 30 to move in the directions of D1 or D2 along the track 36a.

Figure 3:
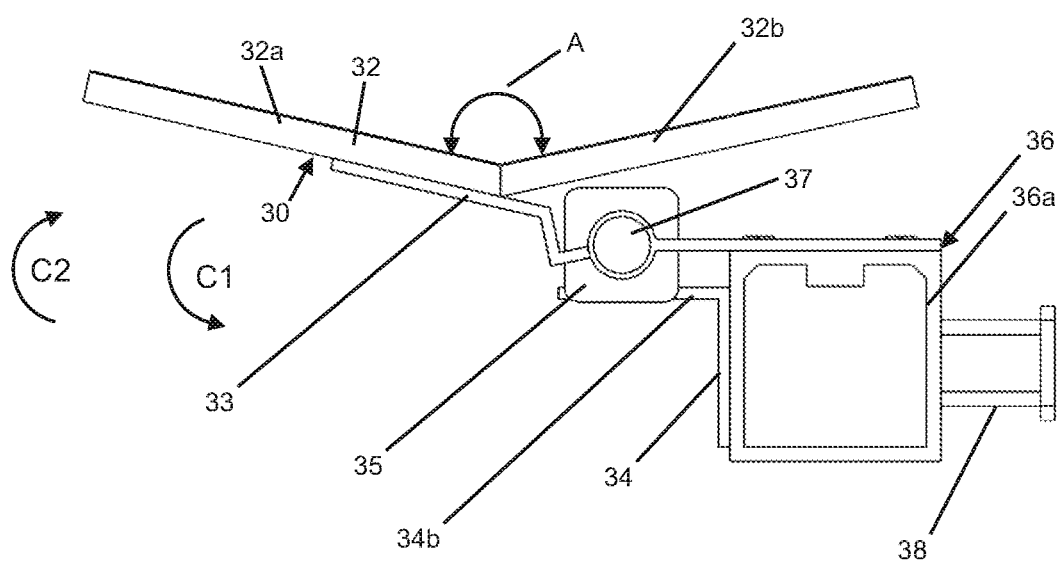
FIG. 3 shows a simplified rear view of some of the components of the apparatus of FIG. 1, shown in the first state, including a delivery device and a track device.

The delivery device 30 includes a tray or plate 32 having a section 32a at an angle A to a section 32b, as shown in FIG. 3, where the angle A may less than one hundred and eighty degrees and greater than zero degrees. In at least one embodiment it is critical that the angle A be less than one hundred and eighty degrees, and greater than one hundred thirty-five degree to allow a significant amount of material to be easily dropped onto the plates or sections 32a and 32b, and to use the angle A, to keep material from falling off of the sections 32a and 32b.

Generally, the sections 32a and 32b of the tray or plate 32 are used to help to prevent material from spilling out from the two sections 32a and 32b of the tray or plate 32 when the plate or tray is receiving materials 10 and 20 from the belts 2a and 12a, respectively, or during the fast movement along the track 36a of the track device 36 when delivering the combined mixed material into the vertical positioned mold or mold device 42.

Figure 2:
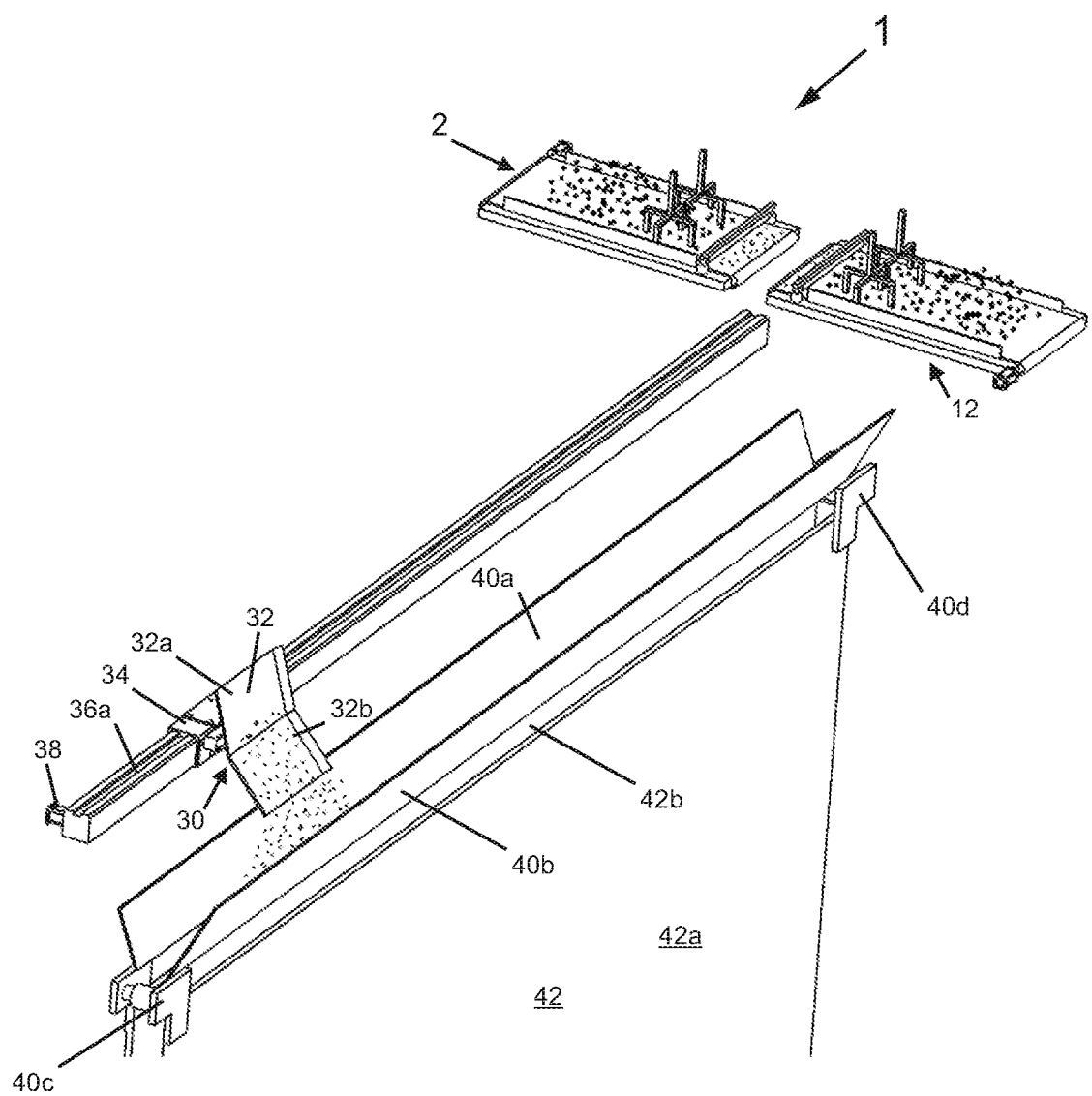
FIG. 2 shows a simplified front, top, and right side perspective view of the apparatus of FIG. 1 in a second state.

The delivery device 30 also includes a member 33 connected at one end to the tray or plate 32 and at its opposite end to a hinge or pivot device 37. The delivery device 30 may further include a servo motor 35 which is controlled by the computer processor 202 to rotate the member 33 at any degree between receiving state degree and full dumping state degree in the clockwise C2 or counterclockwise C1 directions as shown in FIG. 3, in order to rotate the tray or plate 32 to place the tray or plate 32 in either an almost-full dumping state as shown in FIG. 2 or a material receiving state as shown in FIG. 1, or any of half-dumping positions in between during the material delivery process. Also, if desired, the tray or plate 32 can be rotated to various orientations, between the orientation of the receiving state shown in FIG. 1 and the orientation of a full dumping state. The tray or plate 32 and device 34 can be moved or translated to any point or location along the track 36a. The tray or plate 32 can be turned a small degree and quick stopped to cause the tray or plate 32 to have a vibration action to help to have an even drop of materials at certain locations of the track 36a corresponding to certain locations along the length of the opening 42b of the mold or mold device 42.

The delivery device 30 includes a member or device 34 which rides on the track or rail 36a of the track device 36. The member or device 34 includes a section 34b. The member 34 is connected to the hinge 37, the servo motor 35, the member 33, and the tray or plate 32. So when the member 34 moves along the track 36a in the directions D1 or D2 shown in FIG. 1, the components 32, 33, 35, and 37 also move along the track 36a.

The funnel device 40 includes walls or members 40a and 40b. The mold 42 may be an open box, with an opening 42b at the top and having a housing 42a, only part of which is shown in FIG. 1.

The funnel device 40 is lowered into position during fill of the vertical mold 42. In addition, after the vertical mold 42 is filled with material, the funnel device 40 is raised so that the vertical mold 42 can be rotated to a horizontal position.

FIG. 1 shows a receiving state, wherein a first material 10 is moved by the belt 2a in the direction D3, which may be perpendicular to the directions D1 and D2. The first material 10 is mixed by the stirring devices 4 and 6, and then its height is controlled by a member 8a of the gate device 8. The gate device 8 includes member 8a which may be perpendicular to the length of the elongated conveyor belt 2a, and includes posts 8b and 8d, which are moved up or down above the conveyor belt 2a by components 8c and 8e respectively. The computer processor 202 may control the gate device 8 by controlling the components 8c and 8e, which may control the heights of posts 8b and 8d to control the height of member 8a above the conveyor belt 2a. The member 8a may be controlled to be parallel to the width of the elongated conveyor belt 2a which has a length greater than its width. The length of the conveyor belt 2a may be in the direction of movement D3.

After the first material 10 passes under gate member 8a, between gate member 8a and conveyor belt 2a, the material thereafter falls down onto the tray or plate 32. The angled members or sections 32a and 32b function to keep the material 10 from falling off of the tray or plate 32.

Similarly or identically, FIG. 1 shows a receiving state, wherein a second material 20, different from the first material, is moved by the belt 12a in the direction D4, opposite the direction D3, which may be perpendicular to the directions D1 and D2. The second material 20 is mixed by the stirring devices 14 and 16, and then its height is controlled by a member, analogous to member 8a of the gate device 18. The gate device 18 includes member analogous to member 8a which may be perpendicular to the length of the elongated conveyor belt 12a, and includes posts, analogous to posts 8b and 8d, which are moved up or down above the conveyor belt 12a by components analogous to members 8c and 8e respectively. The computer processor 202 may control the gate device 18 by controlling the components analogous to components 8c and 8e, which may control the heights of posts analogous to 8b and 8d to control the height of a member analogous to member 8a above the conveyor belt 12a. The member of gate device 18 analogous to member 8a, may be controlled to be parallel to the width of the elongated conveyor belt 12a which has a length greater than its width. The length of the conveyor belt 12a may be in the direction of movement D4.

After the second material 20 passes under the gate member of gate device 18, analogous to member 8a, between the gate member analogous to member 8a and the conveyor belt 12a, the second material 20 thereafter falls down onto the tray or plate 32. The angled members or sections 32a and 32b function to keep the material 20 from falling off of the tray or plate or 32.

The first material 10 and the second material 20 combine on the tray or plate 32, or in the air while being dropped from the conveyor belts 2a and 12a. The distance of the belt 2a and the belt 12a traveled, in at least one embodiment, is controlled by the computer processor 202 as programmed by computer software stored in computer memory 204, such as through servo motors of first conveyor device motor 2e and second conveyor device motor 12e. The precise amount of the material 10 and/or the material 20 dropped by belt 2a and belt 12a onto tray 32 and the exact time during which the material 10 and/or the material 20 is dropped onto the tray or plate 4, in at least one embodiment, is controlled by computer processor 202, as programmed by computer software stored in computer memory 204, by use of servo motors of first conveyor device motor 2e, and second conveyor device motor 12e, and the height of the members 8a and 18a, of the gate devices 8 and 18, respectively, is also controlled by the computer processor 202, as programmed by computer software stored in the computer memory 204.

In operation, the computer processor 202 can control the motor 38 of the track device 36 to move the delivery device 30 to the location shown in FIG. 1, so that the delivery device 30 can receive a certain amount of the combination of the first material 10 and/or the second material 20 on the tray or plate 32. After a predetermined amount of a combination of the first material 10 and/or the second material 20, such as determined by computer program stored in the computer memory 204, and executed by the computer processor 202, have accumulated on a top surface of the tray or plate 32, the computer processor 202 can control the delivery device 30 to move it in the direction D1, or D2 depending on the location of the delivery device 30, to a certain location along the track 36a of the track device 36 with respect to the mold 42 where the combination material can be deposited through the opening 42b into the mold 42. Moving the delivery device 30 along the track 36a of the track device 36 with respect to the mold 42, as opposed to moving the conveyor device 2 and the conveyor device 12, takes much less energy and results in substantial savings. The conveyor device platform or base 2b and the conveyor device platform or base 12b are typically heavy structures, and it is critical in at least one embodiment that they remain fixed for better efficiency.

FIG. 2 shows a simplified front, top, and right side perspective view of the apparatus 1 of FIG. 1 in a second or delivery state. The track device 36 may include a high speed synchronous belt linear module and may be driven by a servo motor, such as motor 38 controlled by computer processor 202, in the directions of D1 or D2, such as programmed by computer software stored in the computer memory 204.

FIG. 3 shows a simplified rear view of some of the components of the apparatus 1 of FIG. 1, shown in the first state, including a delivery device 30 and a track device 36.

Figure 4:
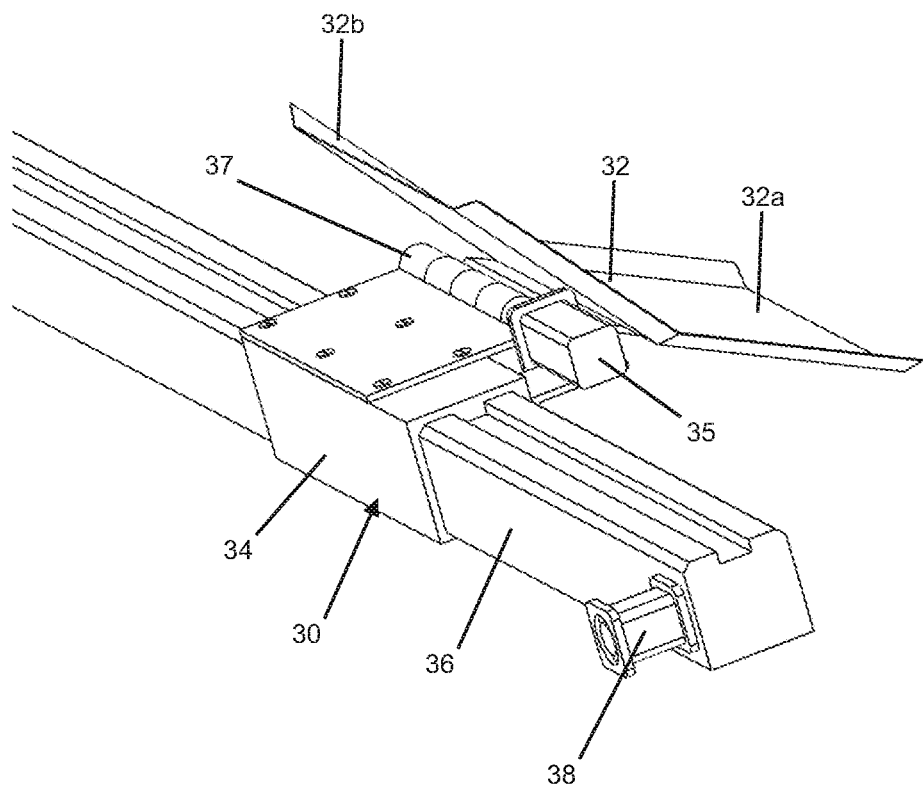
FIG. 4 shows a simplified front, top, and left side view of some of the components of the apparatus of FIG. 1 shown in the second state, including the delivery device and the track device.

FIG. 4 shows a simplified front, top, and left side view of some of the components of the apparatus 1 of FIG. 1 shown in the second state, including the delivery device 30 and the track device 36, with the delivery device 30 shown in a delivery or second state.

FIG. 5 shows a front view of some of the components of the apparatus 1 of FIG. 1, including the first conveyor device 2, the mixing or stirring device 4, and the gate device 8.

FIG. 6 shows a front view of some of the components of the apparatus 1 of FIG. 1, including a second conveyor device 12, a mixing or stirring device 16, and the gate device 16.

FIG. 7 shows a front view of some of the components of the apparatus 1 of FIG. 1, including the delivery device 30 and the track device 36.

FIG. 8 shows a front view of some of the components of the apparatus 1 of FIG. 1, including the funnel device 40 and the mold device 42.

Figure 9:
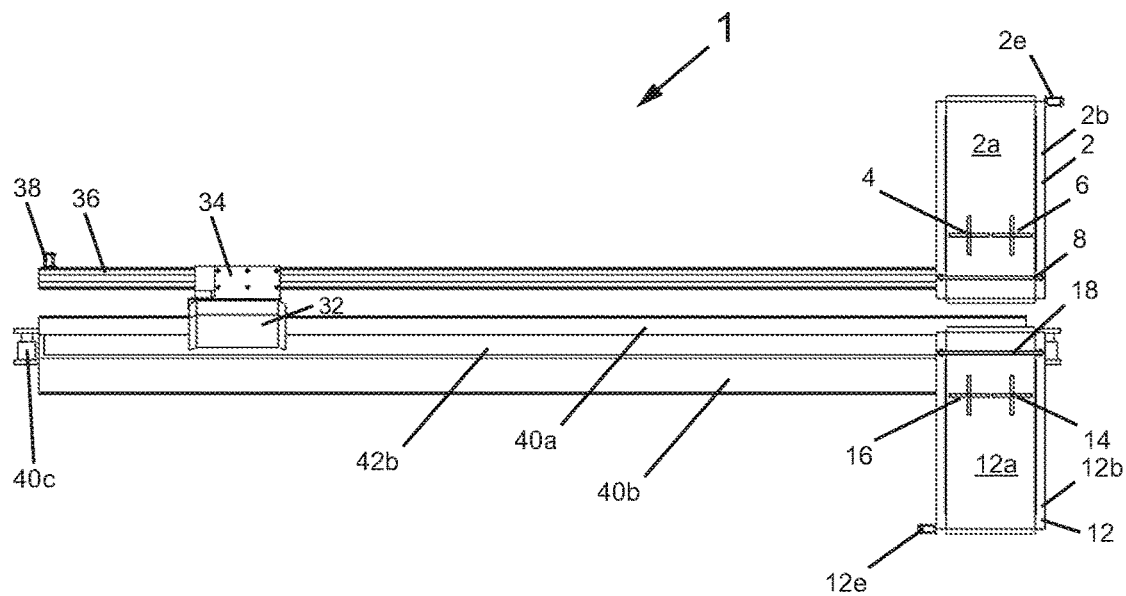
FIG. 9 shows a simplified top view of the apparatus of FIG. 1 in the first state.

FIG. 9 shows a simplified top view of the apparatus 1 of FIG. 1 in the first state or receiving state.

Figure 10:
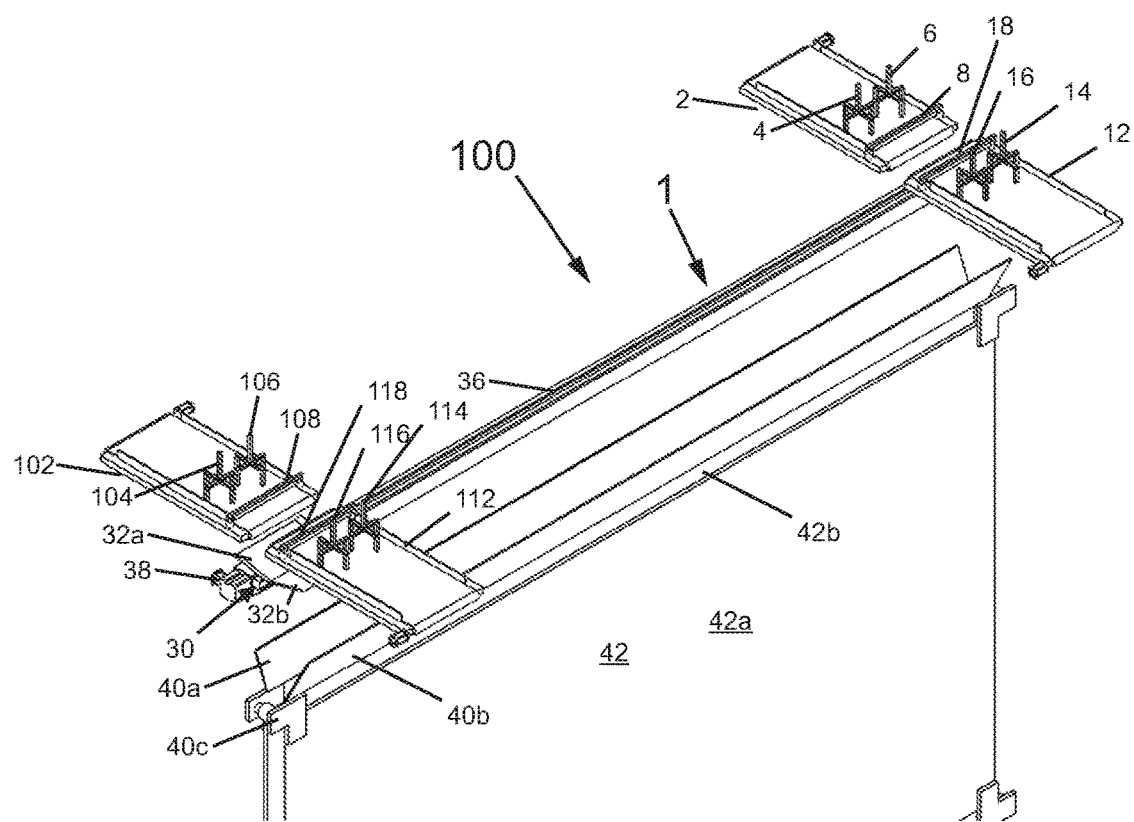
FIG. 10 shows a simplified front, top, and right side perspective view of another apparatus in accordance with an embodiment of the present invention with the apparatus of FIG. 10 shown in a third state, wherein the apparatus of FIG. 10 includes the apparatus of FIG. 1 and additional components.

FIG. 10 shows a simplified front, top, and right side perspective view of apparatus 100 in accordance with an embodiment of the present invention with the apparatus 100 of FIG. 10 shown in a third state, wherein the apparatus 100 of FIG. 10 includes the apparatus 1 of FIG. 1 and additional components.

In FIG. 10, in addition to the apparatus 1, the apparatus 100 also includes conveyor device 102, stirring devices 104 and 106, gate device 108, conveyor device 112, stirring devices 114 and 116, and gate device 118. The conveyor devices 102 and 112 may be similar or identical to the conveyor devices 2 and 12. The stirring devices 104, 106, 114, and 116 may be similar or identical to the stirring or mixing devices 4, 6, 14, and 16. The gate devices 108 and 118 may be similar or identical to the gate devices 8 and 18. The conveyor devices 102 and 112 and related components are provided to allow a twice fast receiving material and delivery material process, or a third material and a fourth material to be provided to the member 32 of the delivery device 30 and thereafter the delivery device 30 can be moved by motor 38 by control of the computer processor 202 to an appropriate location along the length of the track 36a, and with respect to the length of the opening 42b of the mold or mold device 42.

The track device 36 may include a high speed synchronous belt linear module and may be driven by a servo motor, such as motor 38 controlled by computer processor 202, in the directions of D1 or D2.

Figure 11:
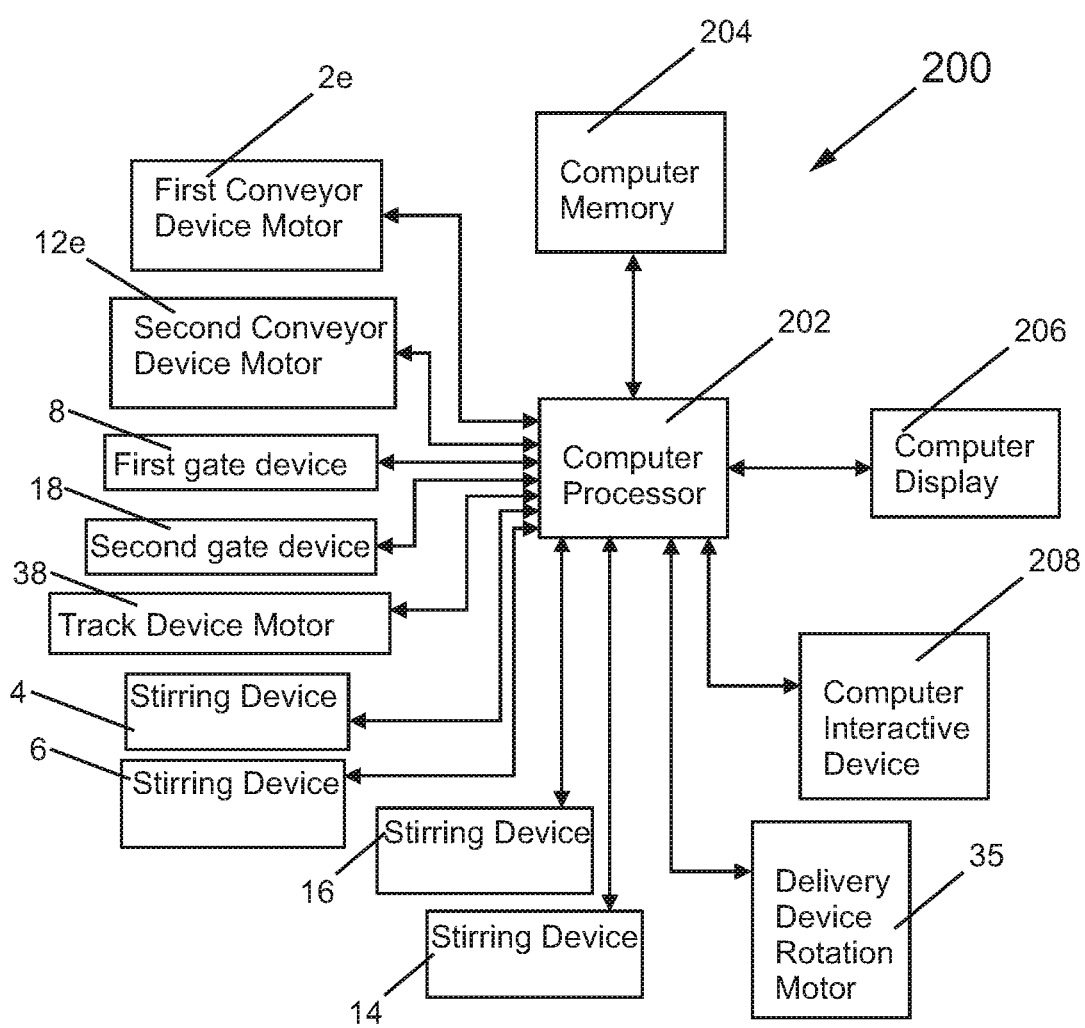
FIG. 11 shows a simplified block diagram of a computer processor and components which communicate with the computer processor.

FIG. 11 shows a simplified block diagram of the computer processor 202 and components which communicate with the computer processor 202. The computer processor 202 communicates with a computer memory 204, a computer display 206, and a computer interactive device 208, which may include a computer mouse or computer keyboard.

The computer processor 202 also communicates with and can control the first conveyor device servo motor 2e, the second conveyor device servo motor 12e, the gate devices 8 and 18, the track device servo motor 38, stirring devices 4, 6, 8, and 18, and the delivery device rotation servo motor 35 which causes certain amount of a combination of materials to be dumped at any position along the track 36 into the mold device or mold 42 through the opening 42b. The computer processor 202 may also control the conveyor device servo motors of the conveyor devices 102 and 112, the stirring devices 104, 106, 114, and 116, and gate devices 108 and 118.

In at least one embodiment, the conveyor devices 102 and 112, along with related components (104, 106, and 108 for conveyor device 102 and 114, 116, and 118 for conveyor device 112) can be placed above the conveyor devices 2 and 12, respectively to mix four material in air or on the tray 32, to add third and/or fourth color materials to a mixture which is dropped onto tray 32.

In at least one embodiment of the present invention, the apparatus 1 or the apparatus 100 or an apparatus with additional conveyor devices above conveyor devices 2 and 12 may deliver a thin line of a combined material into the mold or mold device 42 by moving the tray 32 and device 34 along the track 36*a*, and at the same time gradually turning the tray 32 from receiving level, shown in FIG. 1, to a full-dumping level, at the finishing point, as programmed by computer software stored in the computer memory 204, and as executed by the computer processor 202. For example, a servo motor of the delivery device rotation motor 35 turning the tray 32 can incrementally turn a small amount at a time, such as a degree or a fraction of a degree at a time, and sudden start and sudden stop kind of stop-and-go action can cause the tray 32 with the combination material to vibrate or shake, in order to have a relatively consistent amount of the combination material dropped into the opening 42*b* of the mold 42, at a certain location along the length of the opening 42*b*, as programmed by computer software stored in the computer memory 204 and executed by the computer processor 202.

Figure 12:
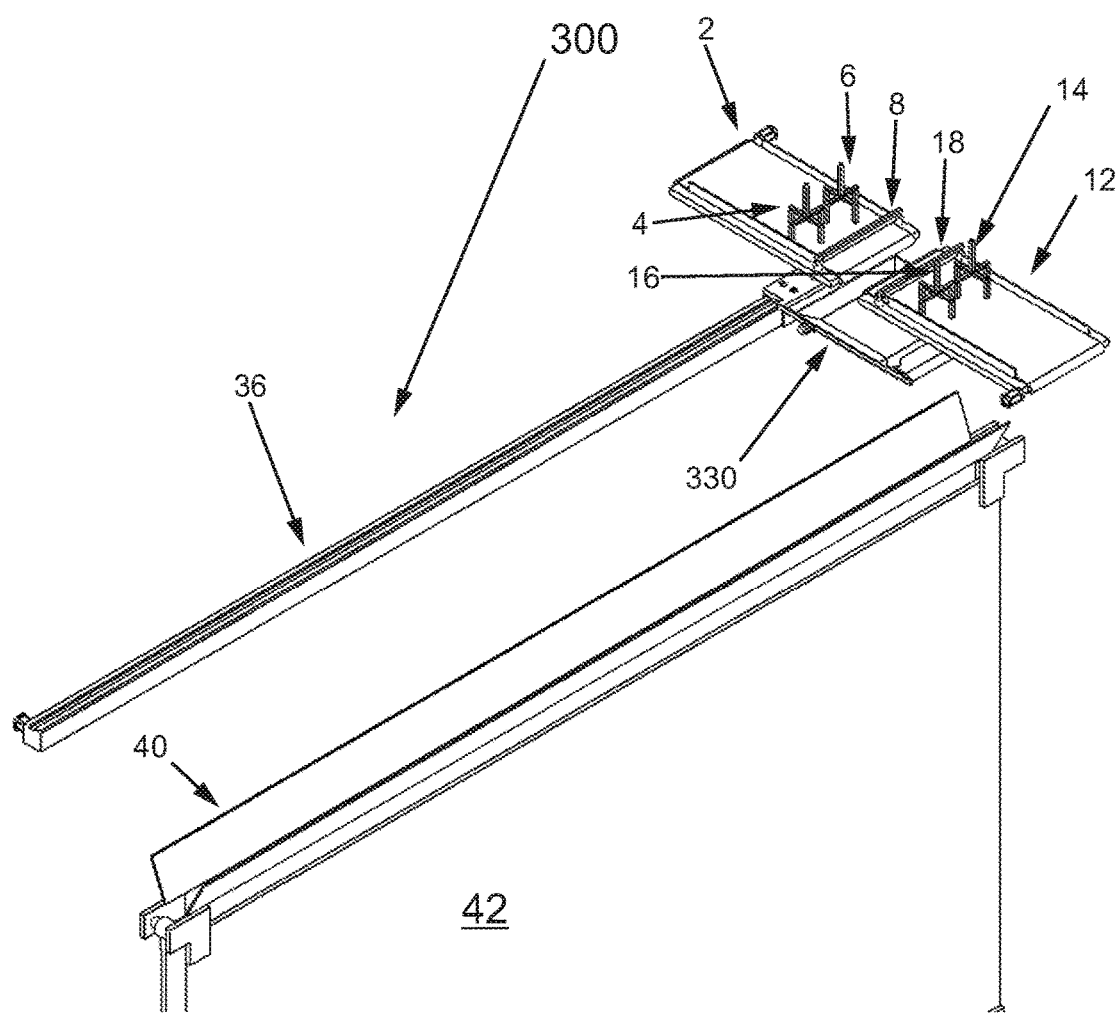
FIG. 12 shows a perspective view of an apparatus in accordance with another embodiment of the present invention, with the apparatus of FIG. 12 shown in a receiving state.
Figure 13:
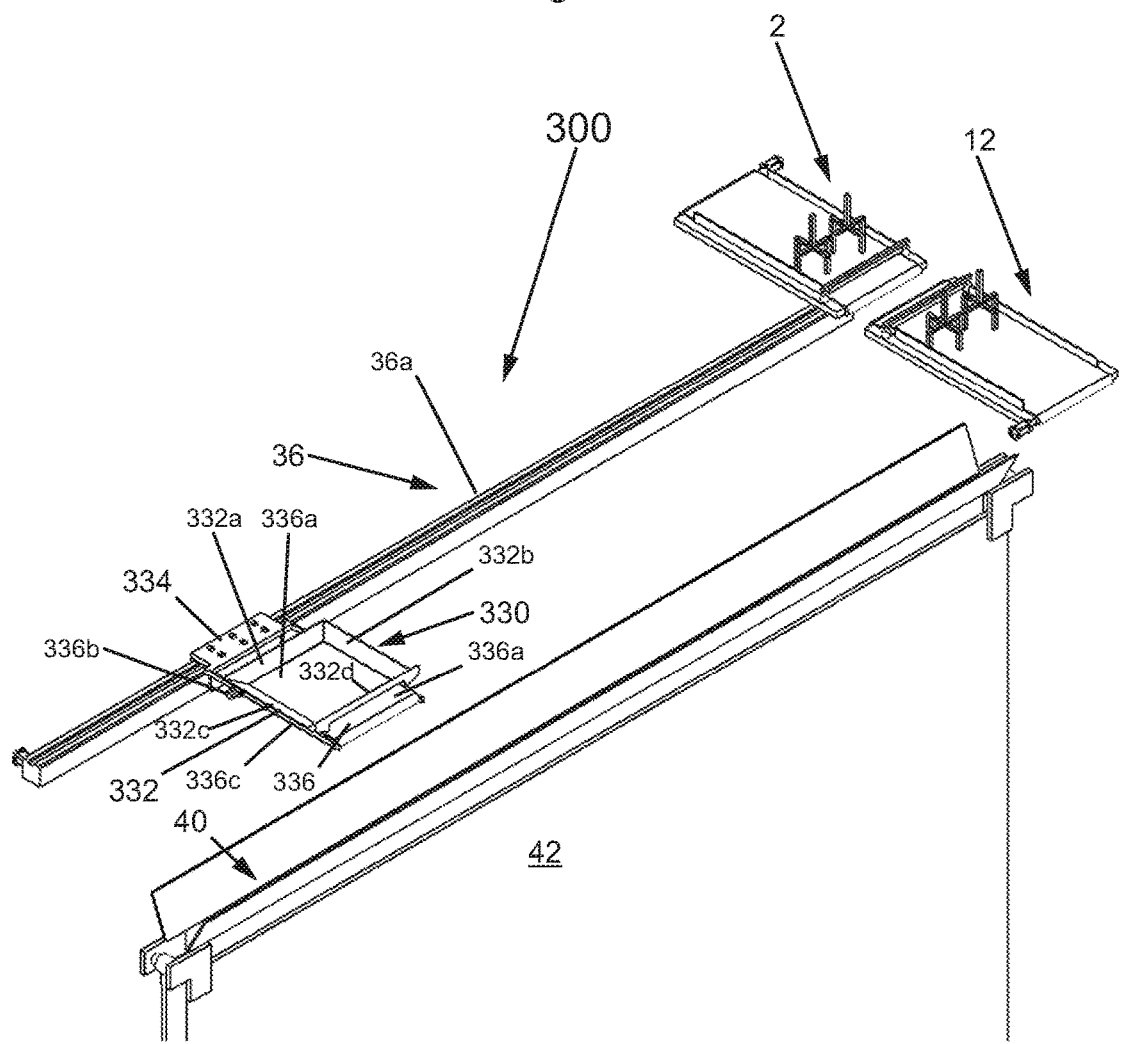
FIG. 13 shows a perspective view of the apparatus of FIG. 12 shown in an altered state.
Figure 14:
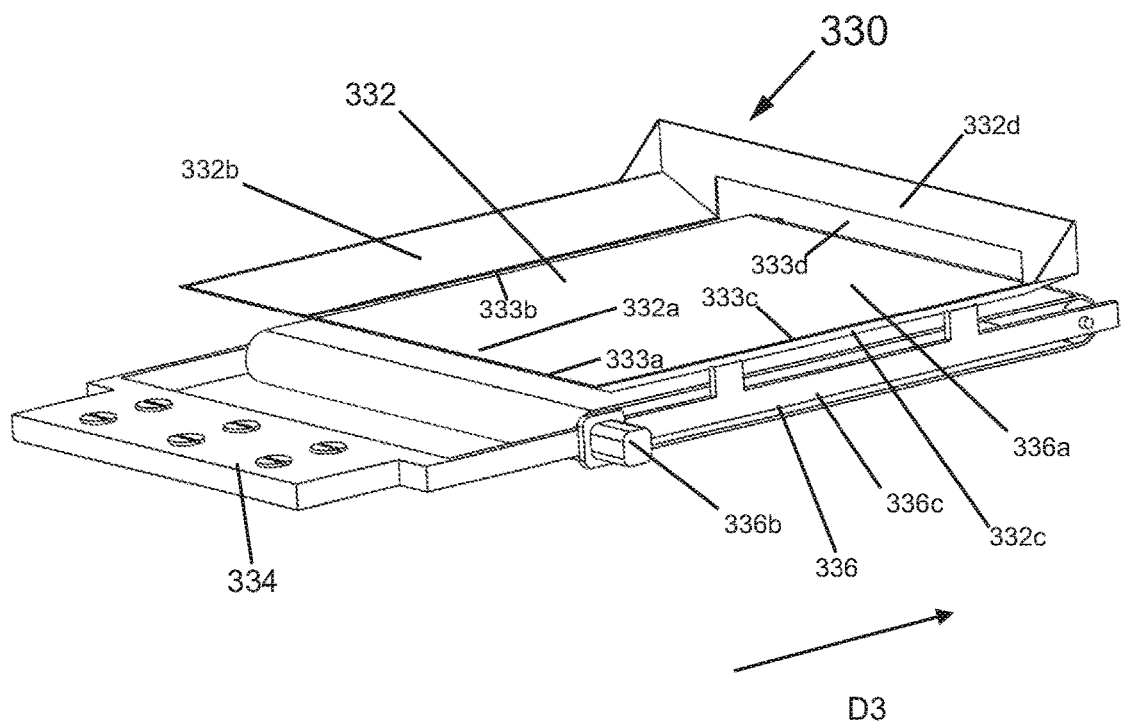
FIG. 14 shows a perspective view of part of the apparatus of FIG. 12

FIG. 12 shows a perspective view of an apparatus 300 in accordance with another embodiment of the present invention, with the apparatus 300 of FIG. 12 shown in a receiving state. FIG. 13 shows a perspective view of the apparatus 300 of FIG. 12 shown in an altered state. FIG. 14 shows a perspective view of part of the apparatus 300 of FIG. 12.

The apparatus 300 may be the same as the apparatus 1 of FIG. 1 except as will be described. The apparatus 300 includes the conveyor device 2, the mixing or stirring device 4, a the mixing or stirring device 6, the gate device 8, the conveyor device 12, the mixing or stirring device 14, the mixing or stirring device 16, and the gate device 18. The apparatus 1 also includes the track device 36, the funnel device 40, and the mold 42.

However, instead of delivery device 30 as in FIG. 1, the apparatus 300 has delivery device 330, which is moved by track device 36. The delivery device 330, as shown by FIG. 14, includes a tray 332, a member 334, and a conveyor device 336. The tray 332 includes a wall 332*a*, a wall 332*b*, a wall 332*c*, and a wall 332*d*. The walls 332*a-d* may be angle, such as preferably at a one hundred and thirty five degree angle with respect to bottom or belt 336*a*. In at least one embodiment, there are small gaps 333*a-c* between the walls 332*a-c* and the bottom or belt 336*a*. The walls 332*a-c* are fixed to member 336*c* of conveyor device 336. The member 336*c* is fixed to member 334 and if the member 334 is stationary, then the member 336*c* is also stationary.

There is a gap 333*d* between the wall 332*d* and the bottom or belt 336*a*. The gap 333*d* is much greater than the gaps 333*a-c*. The conveyor device 336 includes a motor 336*b* which may be controlled by a computer processor, such as computer processor 202 shown in FIG. 11, in accordance with a computer program stored in the computer memory 204.

The belt 336*a*, in a sense forms the bottom of the tray 332, or one can think of the tray 332 as having no bottom. In operation, materials are dropped by the conveyor devices 2 and 12 onto the belt 336*a*, within the perimeter defined by the walls 332*a-d*, typically while the belt 336*a* is not moving, in the state shown in FIG. 12. After a desired amount of materials are dropped onto the belt 336*a*, within the perimeter defined by walls 332*a-d*, the delivery device 330 is moved by the track device 36, along the track 36*a*, such as to a position shown by FIG. 13. After the delivery device 330 has reached a desired position with respect to the funnel device 40 and the mold 42, as controlled by the computer processor 202, in accordance with a computer program stored in computer memory 204, the belt 336*a* is caused to rotate clockwise by the motor 336*b* by the computer processor 202, while member 334 is stationary. The rotation of the belt 336*a*, causes the portion of the belt 336*a* within the perimeter of walls 332*a-d* to initially move in the D3 direction shown in FIG. 14, which causes material on that portion of the belt 336*a* to move through the gap 333*d* and under the wall 332*d*, and to drop off the belt 336*a* and then fall down into the mold 42.

The gaps 333*a-c*, between the walls 332*a-c* and a top portion of the belt 336*a*, may be very small, such as about ¼ inches to just allow the top portion of the belt 336*a* to not rub against the bottom edges of the walls 332*a-c*. The gap 333*d* allowing passage of materials under the wall 332*d*, may be about one inch or could be adjusted.

Figure 15:
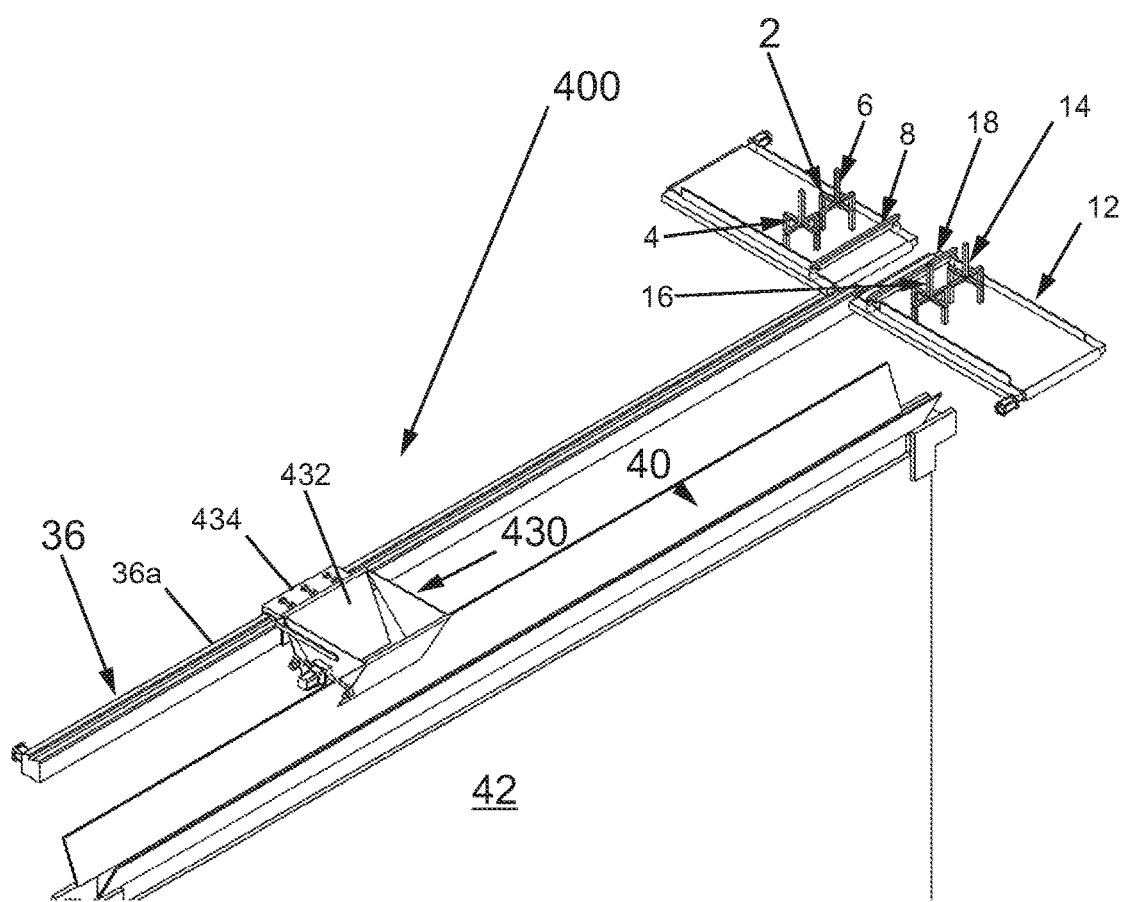
FIG. 15 shows a perspective view of an apparatus in accordance with another embodiment of the present invention, with the apparatus of FIG. 15 shown in a delivery state.
Figure 16:
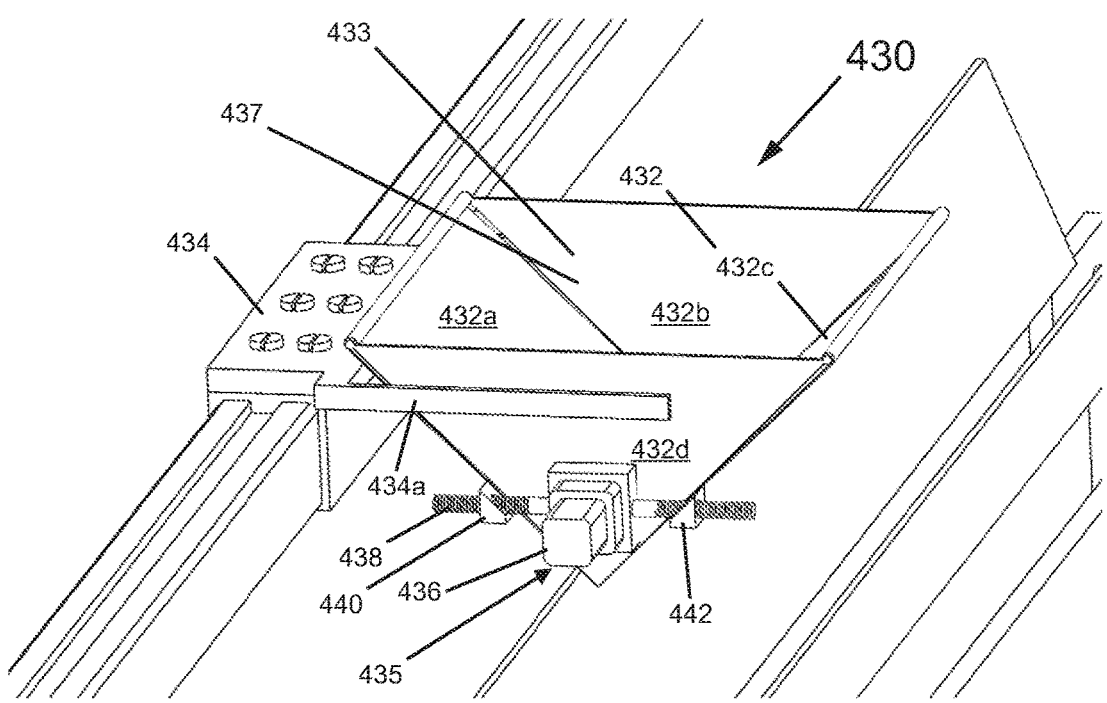
FIG. 16 shows a perspective view of part of the apparatus of FIG. 15.
Figure 17:
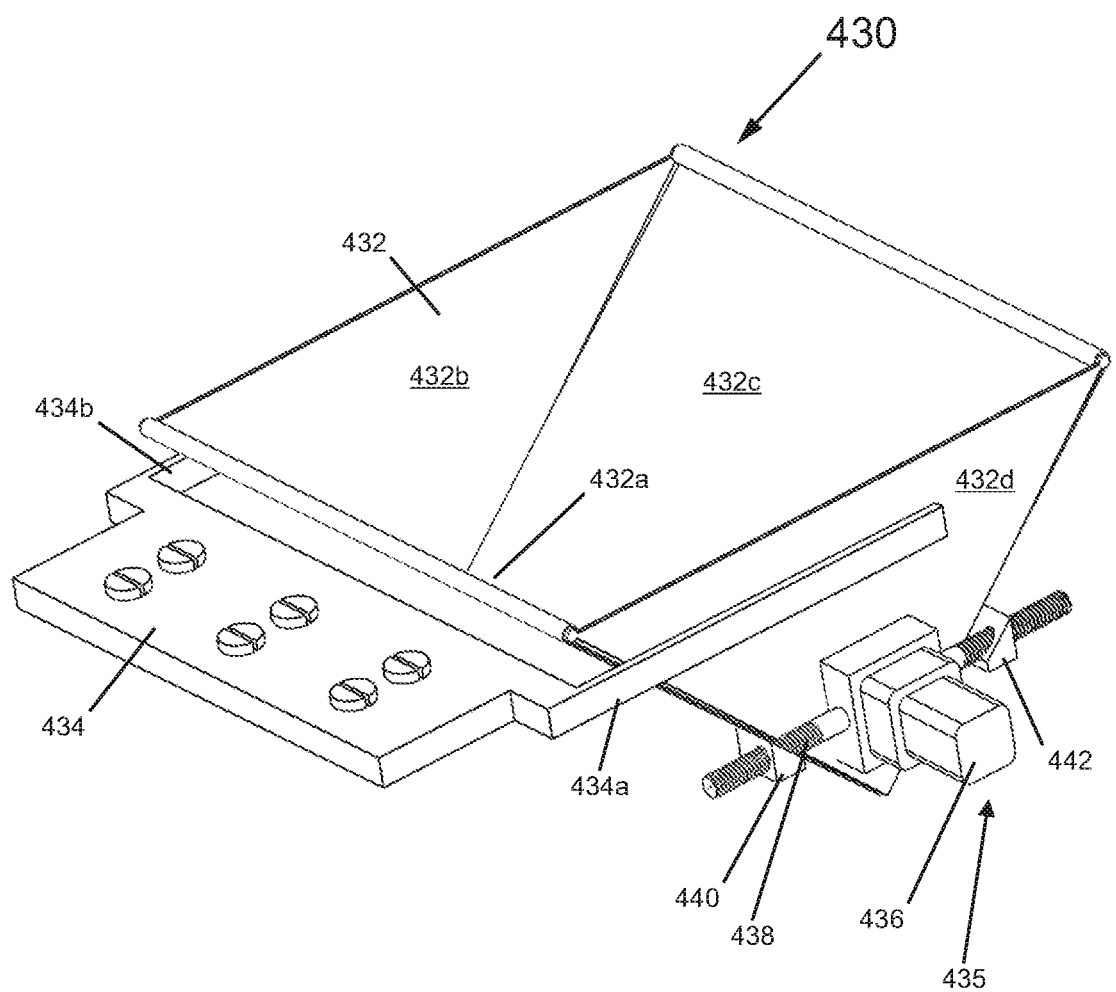
FIG. 17 shows a perspective view of part of the apparatus of FIG. 15.

FIG. 15 shows a perspective view of an apparatus 400 in accordance with another embodiment of the present invention, with the apparatus 400 of FIG. 15 shown in a delivery state. FIG. 16 shows a perspective view of part of the apparatus 400 of FIG. 15. FIG. 17 shows a perspective view of another part of the apparatus 500 of FIG. 15.

The apparatus 400 may be the same as the apparatus 1 of FIG. 1 except as will be described. The apparatus 400 includes the conveyor device 2, the mixing or stirring device 4, a the mixing or stirring device 6, the gate device 8, the conveyor device 12, the mixing or stirring device 14, the mixing or stirring device 16, and the gate device 18. The apparatus 400 also includes the track device 36, the funnel device 40, and the mold 42.

However, instead of delivery device 30 as in FIG. 1, the apparatus 400 has delivery device 430, which is moved by track device 36. The delivery device 430, as shown by FIG. 16, includes a tray 432, a member 434, and an opening device 435. The tray 432 includes a wall 432*a*, a wall 432*b*, a wall 432*c*, and a wall 432*d*. The walls 432*b* and 432*d* may be triangular plates, such as metal plates. The walls 432*a* and 432*c* may be rectangular plates, such as metal plates.

The walls 432*a-d* may together form a triangular prism with an opening 433 at the top, leading to an inner chamber 437, in the orientation shown in FIG. 16. The triangular prism formed by walls 432*a-d* shown in FIG. 16, is sealed or closed or substantially sealed or closed, in the orientation of FIG. 16, so that the materials falling through the opening 433 and into the inner chamber 437 do not fall out of the tray or container 432. T In FIG. 16, the rectangular wall 432*a* has one edge which contacts an edge of the wall 432*b*, one edge which contacts an edge of the wall 432*d*, one edge which contacts an edge of the wall 432*c*, and a top edge which does not contact a wall.

In FIG. 16, the rectangular wall 432*c* has one edge which contacts an edge of the wall 432*b*, one edge which contacts an edge of the wall 432*d*, and one edge which contacts an edge of the wall 432*a*, and a top edge which does not contact a wall.

In FIG. 16, the triangular wall 432*b* has one edge which contacts an edge of the wall 432*a*, one edge which contacts an edge of the wall 432*c*, and a top edge which does not contact a wall.

In FIG. 16, the triangular wall 432*d* has one edge which contacts an edge of the wall 432*a*, one edge which contacts an edge of the wall 432*c*, and a top edge which does not contact a wall.

The triangular wall 432*d* is fixed to member 434*a* of the member 434 which rides or moves on the track 36*a* of the track device 36. Similarly the triangular wall 432*b* is fixed to member 434b of the member 434 which rides or moves on the track 36a of the track device 36 as shown by FIG. 17 and FIG. 15.

The opening device 435 of the delivery device 430 includes a motor 436, a threaded member 438, a nut 440, and a nut 442. The motor 436 is controlled by the computer processor 202 as programmed by computer memory 204, such as through computer interactive device 208, to cause the walls 432a and 432c to rotated and thereby create a bottom opening to allow materials to fall through the tray device 432, as shown by FIG. 15. When the threaded member 438 is rotated by the motor 436, it causes the nuts 440 and 442 which are fixed on the outside of walls 432a and 432c, respectively, to be driven further apart, and to thereby create a bottom opening as in FIG. 15. In FIG. 15, the bottom edges of walls 432a and 432c no longer touch each other, and side edges of walls 432a and 432c are no longer aligned with edges of triangular walls 432b and 432d, which create a bottom opening in device 432, through which material is dropped into mold 42. Note that typically, in at least one embodiment, one top vertex of the wall 432a is fixed to one top vertex of the triangular wall 432d and the opposite top vertex of the wall 432 is fixed to on top vertex of the triangular wall 432b so that the wall 432a rotates with respect to the triangular walls 432b and 432d. Similarly or identically, in at least one embodiment, one top vertex of the wall 432c is fixed to one top vertex of the triangular wall 432d and the opposite top vertex of the wall 432 is fixed to one top vertex of the triangular wall 432b so that the wall 432a rotates with respect to the triangular walls 432b and 432d. There may be an axle running along the top edge of the wall 432a and an axle running along the top edge of the wall 432c for enabling rotation of the walls 432a and 432c with respect to triangular walls 432b and 432d.

Figure 18:
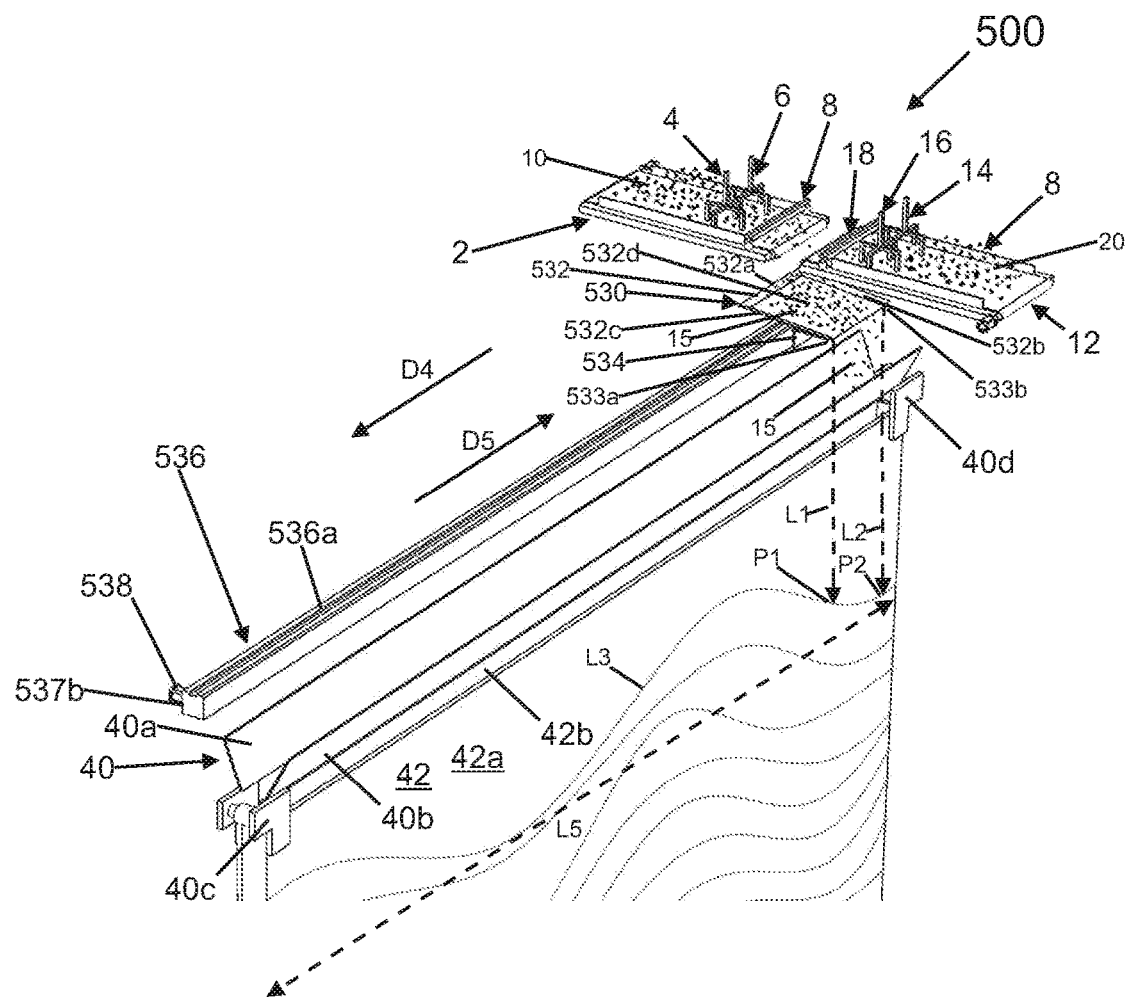
FIG. 18 shows a simplified front, top, and right side perspective view of an apparatus in accordance with an embodiment of the present invention with the apparatus of FIG. 18 shown in a first state.

FIG. 18 shows a simplified front, top, and right side perspective view of an apparatus 500 in accordance with an embodiment of the present invention with the apparatus 500 of FIG. 18 shown in a first state.

The apparatus 500 of FIG. 18 may be identical to the apparatus 1 of FIG. 1, except as will be described.

The apparatus 500, in at least one embodiment, includes the conveyor device 2, the mixing or stirring device 4, the mixing or stirring device 6, the gate device 8, the conveyor device 12, the mixing or stirring device 14, a mixing or stirring device 16, and the gate device 18, similar or identical to the apparatus 1. The apparatus 500 also includes a delivery device 530, a track device 536, the funnel device 40, and the mold 42, wherein components 40, and 42 may be similar or identical to as shown for the apparatus 1 in FIG. 1.

Figure 21:
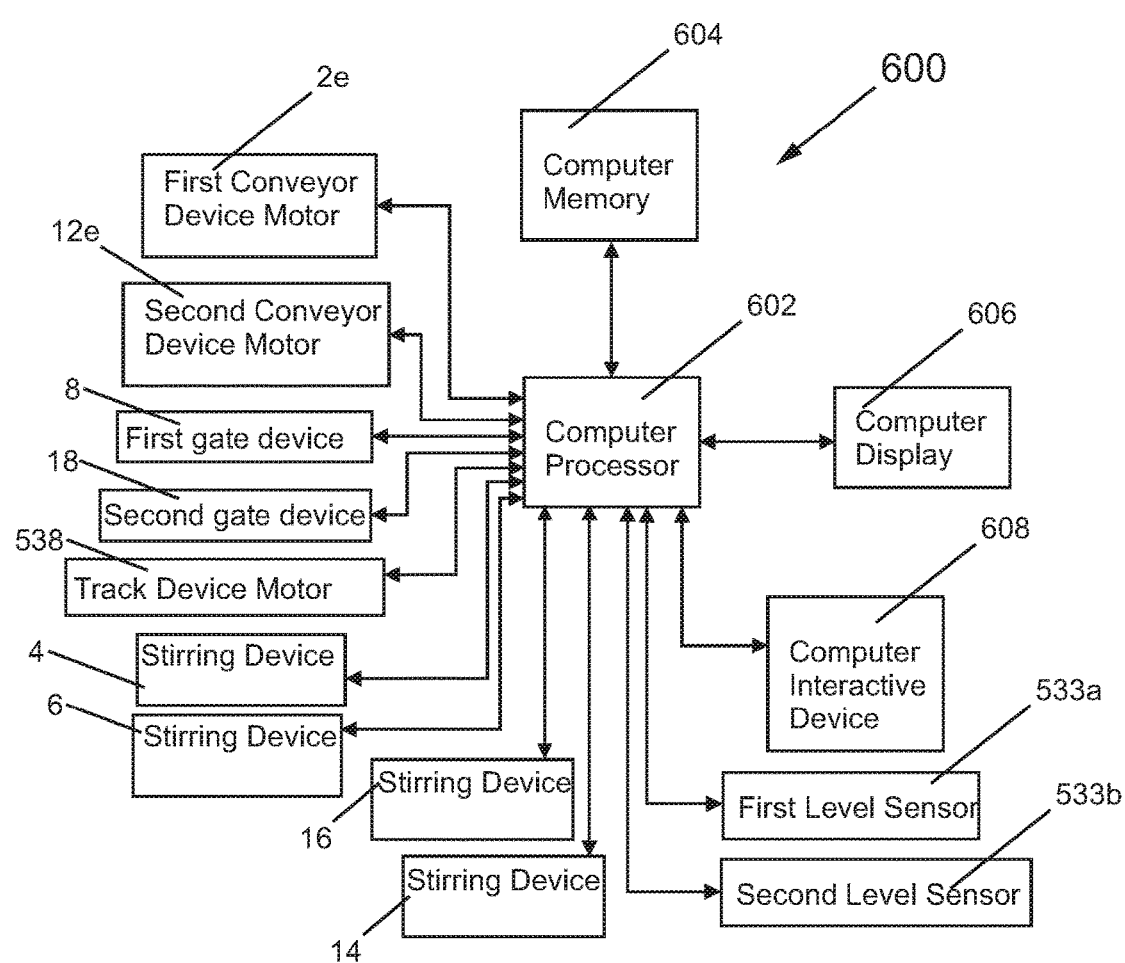
FIG. 21 shows a simplified block diagram of a computer processor and components which communicate with the computer processor, for use with the apparatus of FIG. 18.

The mixing or stirring device 4 may be controlled by a computer processor 602 shown in FIG. 21. The computer processor 602 may be similar or identical to the computer processor 202 of FIG. 11, except as will be described. The computer processor 602 may control the speed at which the central shaft 4a rotates. The computer processor 602 may also control the height of the stirring device 4 in order to level the pile of the material 10 moving toward to the member 8a of the gate device 8.

The track device 536, as shown in FIG. 18, may include the track device servo motor 538 which causes the delivery device 530 to move in the directions of D4 or D5 along the track 536a. The track device 536, and servo motor 538 may be similar or identical to track device 36 and servo motor 38, respectively, except as will be described. The directions D4 and D5 may be the same the directions D1 and D2, respectively, shown in FIG. 1.

The delivery device 530 includes a tray or plate 532 having side walls 532a, 532b, and 532c, bordering bottom plate or sheet 532d. Thus tray 532 has one side, without a wall, opposite the side wall 532a, which allows combination of materials 15 to fall over the side of bottom plate or sheet 532d, opposite side wall 532a, into the mold 42, through opening 42b, as shown in either of FIGS. 18 and 19.

Figure 19:
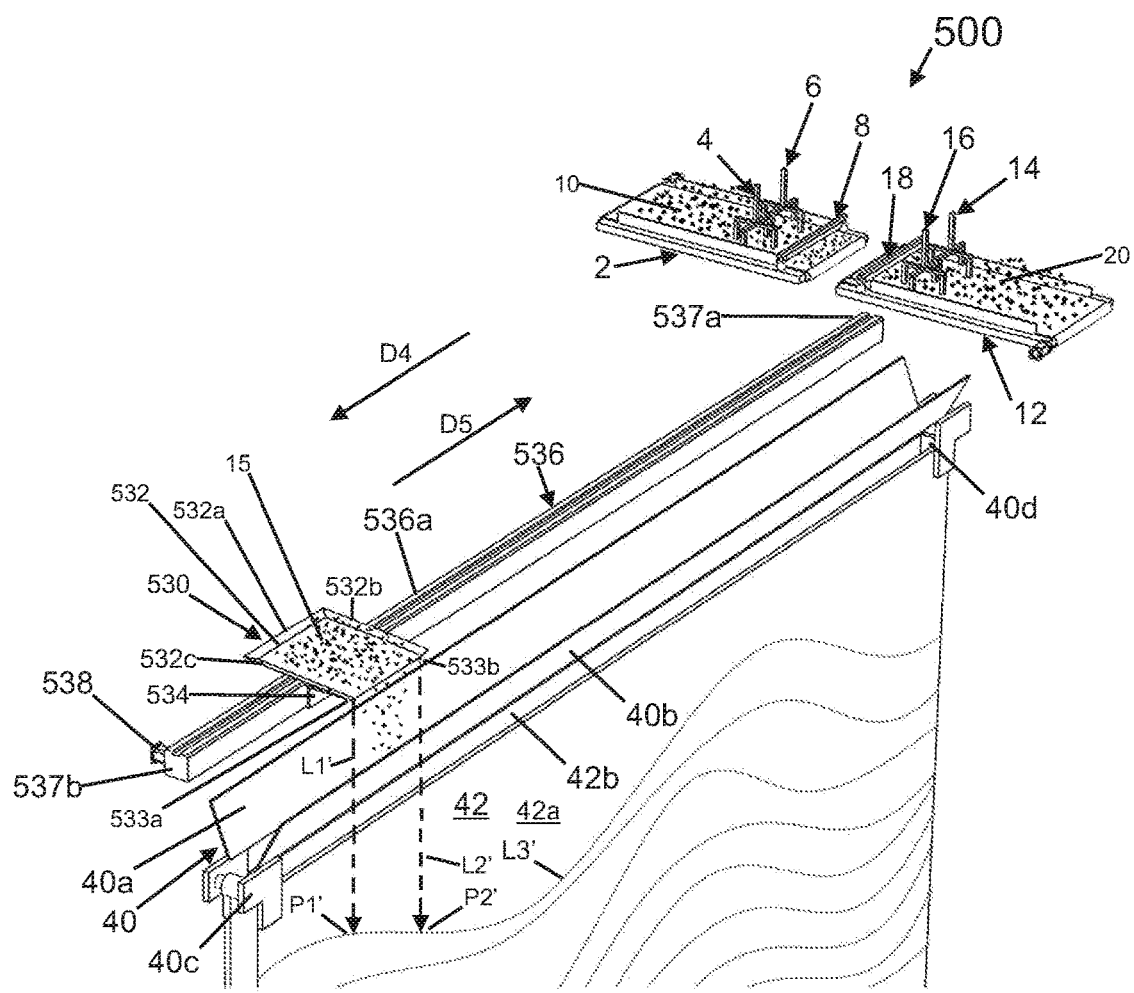
FIG. 19 shows a simplified front, top, and right side perspective view of the apparatus of FIG. 18 in a second state.

The tray or plate 532 and device 534 can be moved or translated to any point or location along the track 536a, similar or identical to as shown for tray 32 of FIG. 1. For example, the tray 532 can be moved to one end 537a of the track 536a, and stopped there, or to the opposite end 537b of the track 536a, and stopped there, or to any other location between ends 537a and 537b, and stopped there, wherein the ends 537a and 537b of track 536a are shown in FIG. 19.

The delivery device 530 includes a member or device 534 which rides on the track or rail 536a of the track device 536. When the member 534 moves along the track 536a in the directions D4 or D5 shown in FIG. 18, the tray 532 also move along the track 536a.

FIG. 18 shows a first state of the apparatus 500 wherein the combination 15 of materials is being delivered at a specific location along the length of the mold 42, through the opening 42b. Prior to the state shown in FIG. 18, the first material 10 from the conveyor device 2 and the second material 20 from the conveyor device 12 were dropped onto the tray 532, similar or identical to the manner described with respect to the apparatus 1 shown in FIG. 1.

The side walls 532a-c function to keep the materials 10 and 20 from falling off of the tray or plate 532.

The first material 10 and the second material 20 combine on the tray or plate 532, or in the air while being dropped from the conveyor belts 2a and 12a, to form a combination material or combination of materials 15.

In operation, the computer processor 602 is programmed by computer software stored in computer memory 604 to control the motor 538 of the track device 536 to move the delivery device 530 to a location, so that the delivery device 530 can receive a certain amount of the combination 15 of the first material 10 and/or the second material 20 on the tray or plate 532. After a predetermined amount of a combination of the first material 10 and/or the second material 20, such as determined by computer program stored in the computer memory 604, and executed by the computer processor 602, have accumulated on a top surface, bottom, or plate 532d of the tray or plate 532, the computer processor 602 can control the delivery device 530 to move it in the direction D4, or D5 depending on the location of the delivery device 530, to a certain location along the track 536a of the track device 536 with respect to the mold 42 where the combination material 15 can be deposited through the opening 42b into the mold 42. Moving the delivery device 530 along the track 536a of the track device 536 with respect to the mold 42, as opposed to moving the conveyor device 2 and the conveyor device 12, takes much less energy and results in substantial savings. The conveyor device platform or base 2b and the conveyor device platform or base 12b, which are shown in FIG. 1, and are incorporated into the embodiment of FIG. 18, are typically heavy structures, and it is critical in at least one embodiment that they remain fixed for better efficiency.

It at least one embodiment, the delivery device 530 includes sensors, sensor devices, or first and second level sensors 533a and 533b, as referred to by the combination of FIGS. 18-21. Each of the first level sensor 533a and the second level sensor 533b, may be a laser sensor, LED (light emitting diode) sensor, sound wave sensor, or any other type of known sensor for determining the distance or height in this case, at a particular point of location, of material dropped into and/or residing in the mold 42. For example, in FIG. 18, the current height of all of the material dropped into the mold 42 is defined by the curved line and/or layer line and/or surface L3. The delivery device 530 is located in FIG. 18, such that sensor 533a, emits a signal or light beam in the direction of dashed line L1, which impacts with and/or detects the height at point P1 of all material dropped into the mold 42. The signal or light beam may reflect back to the sensor 533a and may be interpreted by the computer processor 602 to determine the height at point P1 of all material dropped into the mold 42. Similarly or identically, the delivery device 530 is located in FIG. 18, such that sensor 533b, emits a signal or light beam in the direction of dashed line L2, which impacts with and/or detects the height at point P2 of all material dropped into the mold 42. The signal or light beam may reflect back to the sensor 533b and may be interpreted by the computer processor 602 to determine the height at point P2 of all material dropped into the mold 42.

In at least one embodiment, the computer processor 602 uses the distance or height information measured by the sensors 533a and 533b to control how much further material 15 is dropped into the mold 40 at the locations P1 and P2 or at other locations along the length of the mold 42.

FIG. 19 shows a simplified front, top, and right side perspective view of the apparatus 500 of FIG. 18 in a second state, where the delivery device 530 is located at a different location along the length of the mold 42 from the location shown in FIG. 18.

In FIG. 19, the current height of all of the material dropped into the mold 42 is defined by the curved line and/or layer surface L3'. The delivery device 530 is located in FIG. 19, such that sensor 533a, emits a signal or light beam in the direction of dashed line L1', which impacts with and/or detects the height at point P1' of all material dropped into the mold 42. The signal or light beam may reflect back to the sensor 533a and may be interpreted by the computer processor 602 to determine the height at point P1' of all material dropped into the mold 42. Similarly or identically, the delivery device 530 is located in FIG. 19, such that sensor 533b, emits a signal or light beam in the direction of dashed line L2', which impacts with and/or detects the height at point P2' of all material dropped into the mold 42. The signal or light beam may reflect back to the sensor 533b and may be interpreted by the computer processor 602 to determine the height at point P2' of all material dropped into the mold 42.

In at least one embodiment, the computer processor 602 uses the distance or height information measured by the sensors 533a and 533b to control how much further material 15 is dropped into the mold 40 at the locations P1 and P2 or at other locations along the length of the mold 42.

Figure 20:
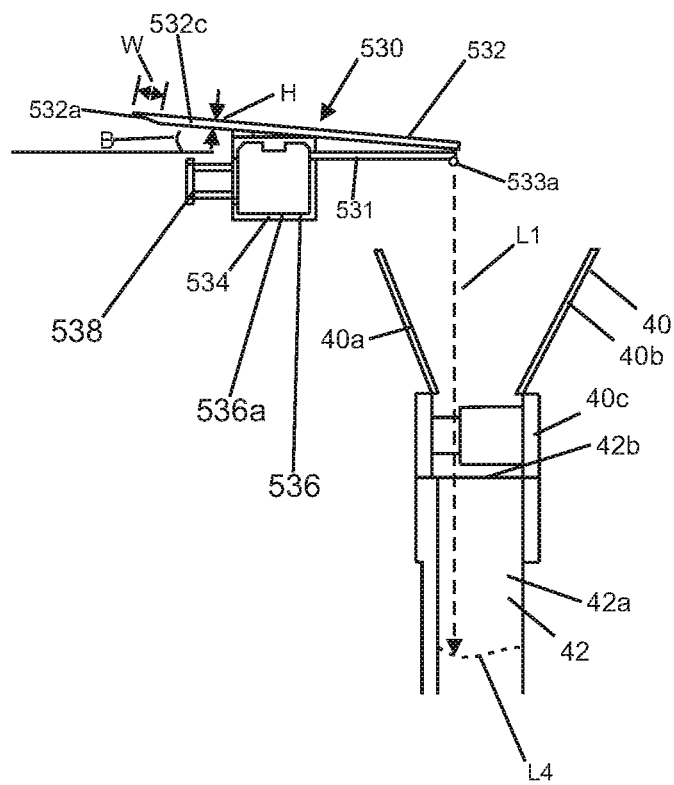
FIG. 20 shows a front view of some of the components of the apparatus of FIG. 18, including a delivery device, a track device, a funnel device, and a mold device of the apparatus of FIG. 18.

FIG. 20 shows a front view of some of the components of the apparatus 500 of FIG. 18, including the delivery device 530, the track device 536, the funnel device 40, and the mold device 42 of the apparatus 500 of FIG. 18. FIG. 20 shows the dashed line L1 to represent the light or signal from the sensor 533a which impact and/or reflect off of a curve L4 representing the height of all material deposited at a particular location with respect to a thickness of the mold 42.

FIG. 21 shows a simplified block diagram of the computer processor 602 and components which communicate with the computer processor 602, for use with the apparatus 500 of FIG. 18. FIG. 21 may be similar or identical to FIG. 11, except as will be described. In at least one embodiment, the components of FIG. 21 do not require a delivery device rotation motor 35, and the components of FIG. 21 include the first level sensor 533a and 533b which are not shown in FIG. 11.

FIG. 21 shows a simplified block diagram of the computer processor 602 and components which communicate with the computer processor 602. The computer processor 602 communicates with a computer memory 604, a computer display 606, and a computer interactive device 608, which may include a computer mouse or computer keyboard.

The computer processor 602 also communicates with and can control the first conveyor device servo motor 2e, the second conveyor device servo motor 12e, the gate devices 8 and 18, the track device servo motor 538, stirring devices 4, 6, 8, and 18, similar or identical to the computer processor 202 shown in FIG. 11. The computer processor 602 may also control the conveyor device servo motors of the conveyor devices 102 and 112, the stirring devices 104, 106, 114, and 116, and gate devices 108 and 118.

In addition the computer processor 602 may execute programming stored in computer memory which vibrates, shakes, and/or causes the delivery device 530 to move along the track 536a in a stop and go motion and how quickly the stop and/or go is needed, and/or a stop, go back and go motion, to cause combination 15 of material to drop into the mold 42 through opening 42b.

For example, in at least one embodiment, the delivery device 530 may be moved in the direction D4 from the position shown in FIG. 18, to a position closer to the end 537b, by the motor 538. The delivery device 530 may then be stopped at a position between ends 537a and 537b, and then moved backwards in the direction D5 towards the end 537a, for a short distance, and then forwards in the direction D4 towards the end 537b for a short distance. The tray device 530 may be shaken by moving the delivery device 530 back and forth in the directions D4 and D5, to cause vibration in order to to cause material 15 to be dropped at an approximate location along the length of the opening 42b of the mold 42. For example, if the servo motor 538 drives the delivery device 530 to stop in the middle of the length of the opening 42b of the mold 42, the delivery device 530 may be moved back and forth plus or minus one half inch (or any distance, in general, the more distance the tray 532 and/or delivery device 530 move, or a faster "sudden stop" or "quick start", the more severe the "shake" or "vibration" will be, therefore the more material on the tray 532 of delivery device 530 will be shaken out and dropped in that general area of the mold 42). The process is controlled by the computer processor 602. In at least some embodiments, most of the time the stop and go action is sufficient to shake or vibrate material into the mold, and only in more severe cases does the tray need to incorporate moving backwards along the track in the stop and go action in order to shake material from the tray device 530 into the opening 42b of the mold 42. The delivery device 530 may be vibrated or moved back and forth at specific locations until the computer processor 602 determines sufficient material has been dropped as determined by predetermined data stored in computer memory 604, or as determined by sensor data from sensor 533a and/or 533b, and/or as determined by both predetermined data and sensor data.

In another embodiment, which can be described as somewhat more continuous, the computer processor 602 may control the delivery device 530 to move in the direction D4, stop at a location P3, move backwards in the direction D5, stop a short distance from location P3, such as at a location P3 minus one half inch, then move forward in the direction D4, to a location P4 which is closer to end 537b than location P3, then move backwards a short distance, such as location P4 minus one half inch, and then repeat this pattern, until the delivery device 530 reaches the end 537b. I.e. go forward to forward stop, go back to back stop, go forward to a forward stop which is closer to end 537b than previous forward stop, go back to a back stop which is closer to end 537b than previous back stop, and repeat the cycle until the delivery device 530 reaches the end 537b. This embodiment provides a continuous or substantially continuous delivery of combination of material 15 over the length L5 of the opening 42b of the mold 42.

Generally, in a least one embodiment, the tray may not need to move backwards, and moving backwards may cause too severe vibrations. Moving delivery device 530 and tray 532 with a stop and go action will cause sufficient shaking or vibration. When the delivery device 530 is moved from a standstill position (zero velocity) with respect to the mold 42, the material 15 may be shaken or moved with respect to the bottom 532d of the tray 532, and this will depend on the acceleration (change in speed) of the delivery device 530. For example, if the delivery device 530 goes from a speed of 0.0 meters per second to 100 meters per second, with respect to the mold 42, in a very short time period, this would be a very high acceleration, and may cause much of the material 15 to simply fall off the tray 532, potentially over the side wall 532b, and potentially not in the mold 42. Similarly, if the delivery device 530 goes from a speed of 100 meters per second to 0.0 meters per second, in a very short time period, this would be a very high deceleration, and may cause much of the material 15 to simply fall of the tray 532, potentially over the side wall 532c, and potentially not in the mold 42.

However, in at least one embodiment, the tray 532 is accelerated (go) and decelerated (stop) an appropriate amount which jostles and/or shakes the material 15 causing it to move slightly back and forth on the bottom 532d, but not to fall over the sides 532b and 532c, and then to slide down the inclined surface of the bottom 532d, over the part of the periphery of the bottom 532d which does not have a side wall, opposite the side wall 532a, and into the mold 42 through opening 42.

In at least one embodiment, the delivery device 530 and tray 532 may be accelerated from a speed of 0 meters per second to a speed of 2.0 meters per second, in 0.2 seconds by computer processor 602 controlling motor 538 of the track device 536. This means that from a stand still start (zero velocity) the delivery device 530 and tray 532 move a distance of X1 meters where X1=½*(acceleration)*(time)2.0, where acceleration=(final velocity−initial velocity)/(time), which is this case is (2−0(1(0.2)=10.0 meters/second2. Thus, X1=½*10*0.2**2=5*.04=0.2 meters. The inventor has determined, in at least one embodiment, that accelerating the delivery device 530 and tray 532 at about 10.0 meters/second2 from a stand still position, and decelerating the delivery device 530 and tray 532 at about −10 meters/second2, from a velocity of 2.0 meters per second results in the material 15 being shaken, and falling off the part of the periphery of the inclined bottom 532d which does not have a side wall of side walls 532-c, and does not cause a substantial portion of the material 15 to fall over any of the walls 532a-c assuming the tray 532 is not overloaded, beyond the heights of walls 532a-c. In at least one embodiment, each of side walls 532a-c may have a height H, shown in FIG. 20 which may be about 2.0 inches above the surface of the bottom 532d. In addition, each of the side walls 532a-c may protrude out from the bottom 532d a width W, shown in FIG. 20, which may be about 2.0 inches.

The tray may be made of a sheet metal like stainless steel, but could be made of any hard suitable material.

In at least one embodiment, material 15 fall off of the tray 532 and off of the bottom 532d has more to do with the combination of the angle B of the slope of the bottom 532d of the tray 532 and the shaking action (with the same shaking magnitude, the larger the angle of the tray is, the more material in the tray will fall off when shaking), and may not have much to do with what kind of material of the tray is made of.

In at least one embodiment, the sides 532a-c are appropriately angled to help to prevent material spill off when the tray 532 and delivery device 530 is moved, and to have an angled side walls 532a-c, with an angle greater than ninety degrees with respect to the bottom 532d, helps the tray 532 of the delivery device 530 to catch more material from the supplying devices, such as from supplying conveyor devices 2 and 12, but in some embodiments, the walls 532a-c may be straight, such as perpendicular to the bottom 532d.

In addition, although the walls 532a-c have a height H which is 2.0 inches in at least one embodiment, the walls can be taller, but about 2.0 inches is preferred for some embodiments, to provide a lightweight tray 532 to move, which requires less power.

Normally the stop and go action is repeated throughout one trip from end 537a to 537b, to shake and/or vibrate tray 532 to cause material 15 to drop.

In at least one embodiment, this kind of controlled delivery process results in a desired, controlled randomness, waved layer patterns of the material in the mold, but near the end of the process of filling the mold 42 with the material 15, due to the controlled randomness, there will be an uneven distribution causing height differences from one region to the next within the mold 42. This may prevent the gate of the mold 42 from closing properly. The sensors 533a and 533b are attached to the frame holding the tray device 532 on delivery device 530 so that while the delivery device 530 and tray 532 travels along the rail or track 536a the sensors 533a and 533b detect the distance or height of the material 15 deposited into the mold 42 at each point. As the sensors 533a and 533b detect the distance or height at each point as the material is being dropped, the computer processor 602 adjusts the magnitude of vibration of the delivery device 530 and/or tray 532, such as by faster stop and go movements when travelling along the track, or in the forward direction then stop, and the backwards direction then stop, and/or shorter plus or minus directional movements about a location where delivery of material 15 is desired, in order to deposit more or less material depending on the specific area and design requirements.

The computer processor 602 shown in FIG. 21, connects and controls the feeding system, including the servo motors 2e and 12e driving the conveyor belts, the delivery system, including the servo motor 538 driving the frame holding the tray 532 and delivery device 530 and the sensors 533a and 533b, to work in unison according to the program stored in memory 604. In at least one embodiment, the delivery device 530 includes a tray or bottom 532 set at a slightly tilted angle with respect to a member 531, and generally with respect to a ground surface 599, as shown in FIG. 20. The tray device 532 also, typically has three angled walls 532a-c. This is done so that when the stop and go motion and/or stop, go, go back, stop, go motion creates vibrations, the material in the tray or tray device 532 will be shaken out of the side without an angled wall, opposite angled wall 532a.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising the steps of:
supplying a predetermined amount of one or more materials to a tray attached to a delivery device, while the tray is in an orientation with respect to a track of a track device, wherein the track is substantially parallel to an elongated opening of a mold, wherein after the predetermined amount of one or more materials is supplied to the tray, none of the predetermined amount of one or more materials is in contact with any structure other than the tray; and
moving the delivery device and the tray along the track of the track device to shake the tray to thereby cause a combination of the one or more materials to fall off of the tray and into the mold through the elongated opening of the mold, in response to control of a computer processor programmed by computer software in computer memory, without moving any part of the tray with respect to any other part of the tray, without changing the orientation of the tray with respect to the track, and without moving any part of the tray with respect to the track, other than along the track.

2. The method of claim 1 wherein
wherein the tray has a bottom having a periphery;
wherein the tray has at least three side walls, which partially enclose the periphery of the bottom of the tray, and which are at an angle with respect to the bottom; and
wherein part of the periphery of the bottom of the tray does not have a corresponding side wall, such that a material dropped on the bottom of the tray, can fall off of the tray by moving over the part of the periphery of the bottom of the tray; and
wherein the step of moving the delivery device and the tray causes the material to move over the part of the periphery of the bottom of the tray, and to fall off of the tray, into the mold through the opening of the mold.

3. The method of claim 2 wherein
the tray has a bottom which is configured at an angle with respect to a ground surface.

4. The method of claim 1 wherein
the step of moving the delivery device and the tray is a stop and go motion of the delivery device and the tray with respect to the mold.

5. The method of claim 1 wherein
The step of moving the delivery device and the tray is a stop, go back, and go motion of the delivery device and the tray with respect to the mold.

6. The method of claim 1 wherein
the tray has a bottom which is configured at an angle with respect to a ground surface.

7. The method of claim 1 wherein
the predetermined amount of one or more materials is supplied to the tray attached to the delivery device in response to control of a computer processor programmed by computer software in computer memory.

8. A method comprising the steps of:
supplying a predetermined amount of one or more materials to a tray attached to a delivery device in response to control of a computer processor programmed by computer software in computer memory;
moving the delivery device and the tray along a track of a track device to thereby cause a combination of the one or more materials to fall off of the tray and into a mold through an opening of the mold, in response to control of the computer processor programmed by computer software in the computer memory;
using a first sensor attached to the delivery device to sense a height of material residing in the mold at a particular location;
and controlling the step of moving the delivery device and the tray to thereby control the amount of material dropped into the mold based on the height sensed by the first sensor, in response to control of the computer processor programmed by computer software in the computer memory.

9. A method comprising the steps of:
supplying a predetermined amount of one or more materials to a tray attached to a delivery device; and
moving the delivery device and the tray along a track of a track device, with stop and go movements, to cause vibrations, such that the vibrations cause a combination of the one or more materials to fall off of the tray and into a mold through an opening of the mold, in response to control of the computer processor programmed by computer software in computer memory; and
detecting the height of one or more materials in the mold at a particular location, and using the computer processor to adjust the stop and go movements, and to thereby adjust a magnitude of vibrations of the delivery device and the tray, in order to control how much additional material from the delivery device and the tray is deposited into the mold at the particular location.

10. A method comprising the steps of:
supplying a predetermined amount of one or more materials to a tray attached to a delivery device;
moving the delivery device and the tray along a track of a track device, at a rate of acceleration; and
causing the movement of the delivery device and the tray along the track of the track device to decelerate at a rate of deceleration;
wherein moving the delivery device and the tray along the track of the track device, at the rate of acceleration and then causing the movement of the delivery device and the tray along the track of the track device to decelerate at the rate of deceleration causes a substantial portion of the predetermined amount of the one or more materials supplied to the tray to fall off of the tray over one side of the tray but not over any other side of the tray, wherein the tray has more than one side.

11. The method of claim 10 wherein
the rate of acceleration is approximately ten meters per second squared; and
the rate of deceleration is approximately ten meters per second squared.

12. The method of claim 10 wherein
the tray has a bottom and a plurality of side walls; and
wherein each of the plurality of side walls has a height extending about two inches above the bottom.

13. The method of claim 10 wherein
the tray has a bottom which is at an angle with respect to the track and remains at the angle with respect to the track while the tray moves along the track.

14. The method of claim 10 wherein the predetermined amount of one or more materials is supplied to the tray attached to the delivery device in response to control of a computer processor programmed by computer software in computer memory.

\* \* \* \* \*